United States Patent [19]
Iwata et al.

[11] Patent Number: 5,723,959
[45] Date of Patent: Mar. 3, 1998

[54] POWER WINDOW DRIVING CONTROL DEVICE

[75] Inventors: Hitoshi Iwata; Kanichi Tanaka; Shigekazu Yasuda; Yasushi Nishibe; Kenichi Kinoshita, all of Aichi-ken, Japan

[73] Assignee: Tokai-Rika-Denki Seishakusho Kabushiki Kaisha, Aichi-ken, Japan

[21] Appl. No.: 613,599

[22] Filed: Mar. 11, 1996

Related U.S. Application Data

[63] Continuation of Ser. No. 101,079, Aug. 4, 1993, abandoned.

[30] Foreign Application Priority Data

| Aug. 4, 1992 | [JP] | Japan | 4-207892 |
| Aug. 4, 1992 | [JP] | Japan | 4-207984 |
| Aug. 4, 1992 | [JP] | Japan | 4-207985 |
| Aug. 7, 1992 | [JP] | Japan | 4-211174 |

[51] Int. Cl.⁶ .................................................. H02K 17/34
[52] U.S. Cl. ........................ 318/447; 318/452; 318/266
[58] Field of Search ............................ 318/256, 264–267, 318/283–286, 447, 452–454, 468, 469; 296/223, 200, 146.1, 146.2; 307/10.1; 49/18, 26, 28; 160/1, 29, 49, 138, 188, 291, 292, 293.1

[56] References Cited

U.S. PATENT DOCUMENTS

| 4,234,833 | 11/1980 | Barrett | 318/282 |
| 4,364,003 | 12/1982 | Phipps | 318/467 |
| 4,383,206 | 5/1983 | Matsuoka et al. | 318/445 |
| 4,562,387 | 12/1985 | Lehnhoff | 318/285 |
| 4,621,223 | 11/1986 | Murakami et al. | 318/282 |
| 4,641,067 | 2/1987 | Iizowa et al. | 318/287 |
| 4,678,975 | 7/1987 | Vrabel et al. | 318/266 |
| 4,709,196 | 11/1987 | Mizuta | 318/282 |
| 4,725,765 | 2/1988 | Miller | 318/434 |
| 4,749,924 | 6/1988 | Watanabe et al. | 318/286 X |
| 4,870,333 | 9/1989 | Itoh et al. | 318/286 |
| 4,970,446 | 11/1990 | Yaguchi | 318/280 |
| 5,138,182 | 8/1992 | Kokubu | 307/10.1 |

Primary Examiner—Brian Sircus
Attorney, Agent, or Firm—Hazel & Thomas

[57] ABSTRACT

A power window driving control device formed of a measuring device which measures time elapsed since closing of a window glass has been designated by a switch, a sensor which detects a completely closed state of the window glass, a current detecting device which detects that current flowing to a motor when the window glass is being closed exceeds a predetermined value, and a driving control device which effects one of stopping the motor and stopping the motor after driving the motor reversely for a predetermined time, in at least one of a first state, in which the current detecting device detects that the current flowing to the motor exceeds the predetermined value and in which the completely closed state of the window glass is not detected by the sensor, and a second state, in which the time elapsed since closing of the window glass was designated exceeds a predetermined time. Even if a foreign object exists on a path of movement of the window glass in a closing direction, the foreign object is not caught between the window glass and a window frame so that stability is guaranteed.

3 Claims, 18 Drawing Sheets

POWER WINDOW DRIVING CONTROL DEVICE

This application is a Continuation of application Ser. No. 08/101,079, filed Aug. 4, 1993 now abandoned.

BACKGROUND OF THE INVENTION

1. Field of the Invention

The present invention relates to a power window driving control device, and in particular, to a power window driving control device which moves a window glass of a vehicle in vertical directions by the driving force of a motor.

2. Description of the Related Art

Generally, a manual switch and an automatic switch are provided together in a switch for a power window which moves a window glass of a vehicle in vertical directions.

In an automatic switch, when either the up side contact or the down side contact is turned on, even if the operator of the switch removes his/her hand from the switch, the driving of the motor continues, and the window glass moves until it is either completely opened or completely closed. For example, when a window glass is moved from a completely open state to a completely closed state, when the window glass is completely closed, movement thereof is prevented by the window frame or the like, and the driving current of the motor varies. The amount of variation in the driving current of the motor is detected, and when it exceeds a predetermined value, a determination is made to stop the movement of the window glass, and the motor is stopped.

In a manual switch, the movement of the window glass in vertical directions is effected by manual operation. A vehicle occupant presses a switch in a desired direction, and the window glass is moved in a direction corresponding to the pressing. When the window glass reaches a desired position, the occupant stops pressing the switch. Accordingly, the window glass can be stopped at a predetermined position.

A structure has been proposed in which abnormal current, which is generated when a foreign object becomes caught between the window glass and the window frame when the automatic switch is on, is detected, and driving of the motor is stopped or the motor is reversed.

However, both manual switches and automatic switches for conventional power windows are based on the premise that the operation of designating the raising/lowering of the window glass is being effected by the occupant. When the occupant continues to press either of the above switches and the switch is continuously on in order to designate the raising of the window glass, the raising of the window glass continues even if a foreign object or the like exists on the path along which the window glass is raised. A drawback arises in that the foreign object continues to be caught between the window frame and the window glass. Further, regardless of a designation by a manual switch to close the window glass when a foreign object is caught, the window glass is unconditionally lowered (opened), which is contrary to the intent of the occupant.

Moreover, in cases in which the raising of the window glasses of all of the seats of the vehicle is effected automatically, if, for example, there is a foreign object in a rear passenger's window glass and an occupant in another seat (the driver's seat) is unaware and attempts to raise the rear passenger's window glass, a drawback arises in that the foreign object will become caught between the window glass and the window frame.

Because rush current is generated at the beginning of operation of the operating switch, a structure has been proposed in which a blanking period is provided at the beginning of operation of an operating switch so that rush current is not incorrectly judged to be abnormal current.

However, due to this reversal operation, the window glass is lowered even during, for example, operation (up operation) to close the window glass by a manual switch. Therefore, the effect is opposite the intent of the vehicle occupant. Further, if the operation to raise the window is continued, the window glass may be lowered until it is completely open.

There are cases in which operations to open a window glass and operations to close the same window glass are effected simultaneously. Namely, a master switch is provided such that opening and closing operations of the window glasses of all of the doors can be effected from the driver's seat. Each of the doors is provided with its own switch for opening and closing the window glass of the door. The operations of these switches may therefore counter each other. In such a case, although the driving of the motor is stopped, the blanking period passes because the circuit for detecting the foreign object is working. Here, if operation of one of the switches (for example, the down operating switch) is canceled, rush current is generated in the circuit. However, because the blanking period in the circuit has elapsed, the rush current is erroneously judged to be abnormal current. A drawback arises in that a reversing operation or the like is effected.

SUMMARY OF THE INVENTION

The present invention was developed in order to solve the above-described drawbacks, and the object thereof is to provide a power window driving control device in which a foreign object is not continued to be caught between a window glass and a window frame even if the foreign object exists on the path along which the window glass is raised.

Another object of the present invention is to provide a power window driving control device in which raising and lowering operations of a window glass can be effected such that even if a foreign object exists on the path along which the window glass is raised, the foreign object is not continued to be caught between the window glass and a window frame, and operations do not run contrary to the intent of the occupant.

A further object of the present invention is to provide a power window driving control device in which, even if operations to move a window glass in vertical directions are effected by a manual switch, foreign objects are not continued to be caught between the window glass and a window frame.

Another object of the present invention is to provide a power window driving control device in which a window glass is not moved any more than necessary in a direction opposite to the direction intended by a vehicle occupant (either the opening direction or the closing direction).

In addition to the above-described objects, another object of the present invention is to provide a power window driving control device in which rush current, which is generated during operation of a switch, and abnormal current, which is generated by a foreign object being caught between the window glass and the window frame, can be clearly distinguished so as to prevent faulty operation.

BRIEF DESCRIPTION OF THE DRAWINGS

FIG. 18 is a time chart explaining operations for evading catching of a foreign object between the window glass and a window frame and the like.

DESCRIPTION OF THE PREFERRED EMBODIMENTS

A first embodiment of the present invention will be described in detail hereinafter with reference to the accompanying drawings.

Figure 1:
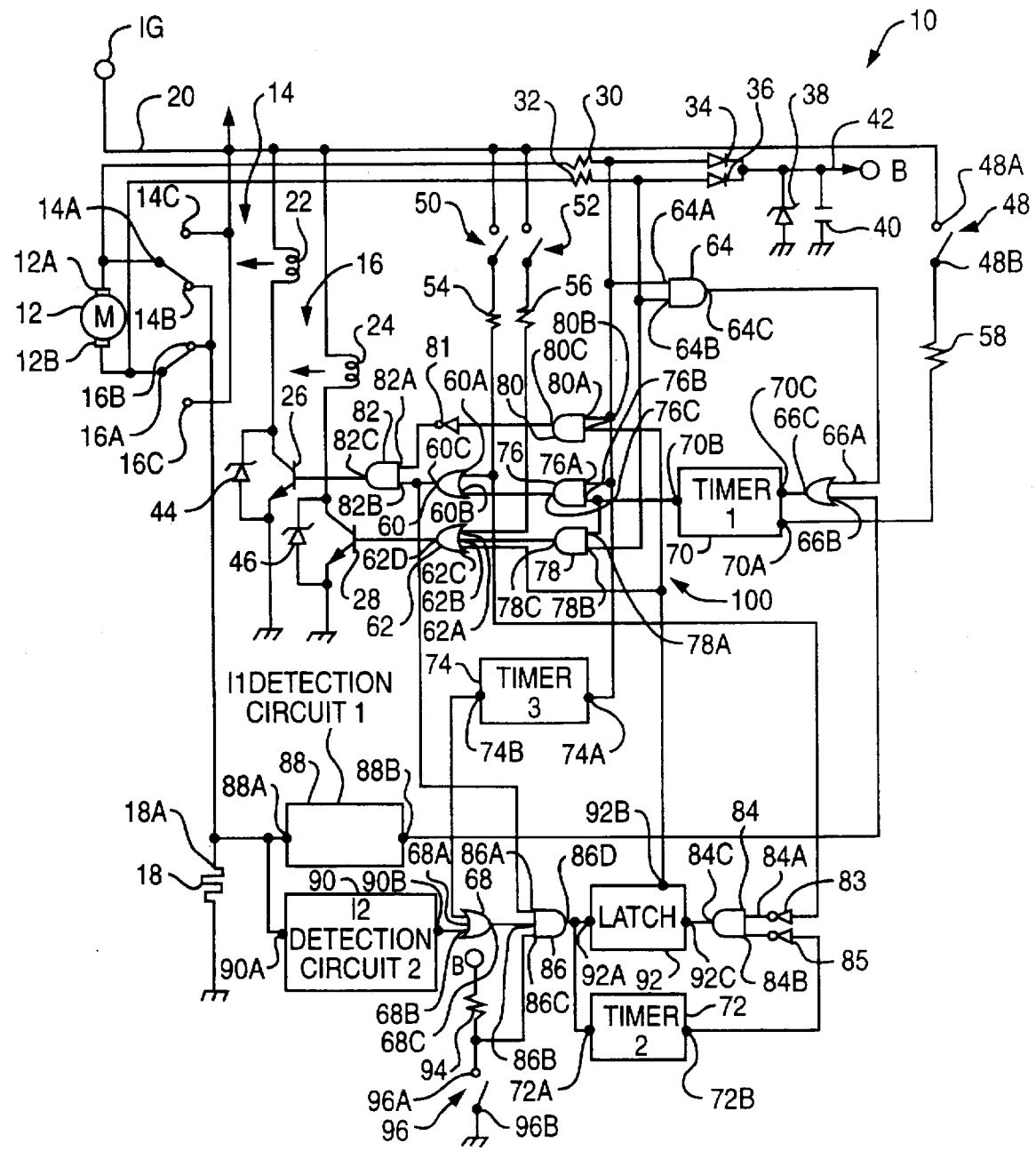
FIG. 1 is a block diagram illustrating a schematic structure of a power window driving control device relating to a first embodiment of the present invention.

In FIG. 1, the schematic structure of a power window driving control device 10 relating to the present embodiment is illustrated as a block diagram.

Common terminals 14A, 16A of first and second relay circuits 14, 16 are connected to terminals of a motor 12 for driving a power window, respectively. The first relay circuit 14 is used for raising the window glass, and a first contact 14B thereof is grounded by a minute resistor 18 (about 10 mΩ). A second contact 14C is connected to a power source wire 20. The first relay circuit 14 is equipped with a first coil 22. When the first coil 22 is not energized, the first contact 14B is switched. When the first coil 22 is energized, the second contact 14C is switched. The power source wire 20 is connected via an unillustrated ignition switch to a terminal IG which is connected to a battery BT installed in a vehicle. When the unillustrated ignition switch is turned on, power is supplied to the power source wire 20.

The second relay circuit 16 is used for lowering the window glass. A first contact 16B thereof is grounded by the minute resistor 18. The second relay circuit 16 is equipped with a second coil 24. When the second coil 24 is not energized, the first contact 16B is switched. When the second coil 24 is energized, a second contact 16C is switched.

Respective ones of the terminals of the first and second coils 22, 24 are connected to the power source wire 20. Respective other terminals thereof are connected to NPN type first and second transistors 26, 28. The emitters of the first and second transistors 26, 28 are grounded, and are connected to respective collectors via Zener diodes 44, 46. Accordingly, the first coil 22 is energized by the transistor 26 being turned on, and the second contact 14C of the first relay circuit 14 is switched so that the motor 12 is driven forward and the window glass is raised. Further, the second coil 24 is energized by the transistor 28 being turned on, and the second contact 16C of the second relay circuit 16 is switched so that the motor 12 is driven in reverse and the window glass is lowered.

The common terminal 14A of the first relay circuit 14 is connected to the power source wire 42 via a resistor 30 and a diode 34. The common terminal 16A of the second relay circuit 16 is connected to a power source wire 42 via a resistor 32 and a diode 36. One terminal of a capacitor 40 is connected to the power source wire 42, and the other terminal of the capacitor 40 is grounded. Further, the cathode of the Zener diode 38 is connected to the power source wire 42, and the anode is grounded. Accordingly, when a manual switch 50 is pushed, power is supplied to the power source wire 42 via the resistor 30 and the resistor 32. A power source B, serving as a low-voltage power source, is formed at the power source wire 42 by the Zener diode 38 and the capacitor 40.

Respective ones of the terminals of the manual switch 50 for raising the window glass and a manual switch 52 for lowering the window glass are connected to the power source wire 20. The other terminal of the manual switch 50 is connected to a first input terminal 60A of an OR circuit 60 via a resistor 54. The other terminal of the manual switch 52 for lowering the window glass is connected to a first input terminal 62A of an OR circuit 62 via a resistor 56.

The OR circuits 60, 62 are important structural elements of a logic circuit portion 100 for turning on and off the transistors 26, 28 which are used to operate the first and second relay circuits 14, 16. An output terminal 76C of an AND circuit 76 is connected to a second input terminal 62B of the OR circuit 60. A first input terminal 76A of the AND circuit 76 is connected between the resistor 30 and the diode 34. A second input terminal 76B of the AND circuit 76 is connected to an output terminal 70B of a first timer circuit 70 which is at a high level when an automatic switch 48, which will be described later, is on. Further, an output terminal 60C of the OR circuit 60 is connected to a second input terminal 82B of an AND circuit 82 whose output terminal 82C is connected to a base of the transistor 26. An output terminal 80C of an AND circuit 80 is connected to a first input terminal 82A of the AND circuit 82 via an inverter 81. A first input terminal 80A of the AND circuit 80 is connected between the resistor 32 and the diode 36. A second input terminal 80B of the AND circuit 80 is connected to an output terminal 92B of a latch circuit 92 which will be described later. Accordingly, the transistor 26 is turned on and off in accordance with a signal obtained by a logical product of, on the one hand, a reversal signal of a signal obtained by the logical product of the AND circuit 80 and, on the other hand, a signal of a logical sum of the OR circuit 60.

The OR circuit 62 has first, second and third input terminals 62A, 62B, 62C. The second input terminal 62B is connected to an output terminal 78C of an AND circuit 78. A first input terminal 78A of the AND circuit 78 is connected to the output terminal 70B of the first timer circuit 70. A second input terminal 78B of the AND circuit 78 is connected between the resistor 32 and the diode 36. An output terminal 62D of the OR circuit 62 is connected to the base of the transistor 28. Accordingly, the transistor 28 is turned on and off in accordance with the signal obtained by the logical sum of the input signal of the OR circuit 62.

The automatic switch 48 is mounted to the manual switch 50 for raising the window glass and the manual switch 52 for lowering the window glass. The automatic switch 48 is driven mechanically so as to be turned on when the operating amount by which either of the manual switches 50, 52 is pushed is great. For example, when the operating amount of the manual switch 50 for raising the window glass is small, the manual switch 50 is on, and the automatic switch 48 is off. When the operating amount of the manual switch 50 is large, both the manual switch 50 and the automatic switch 48 are turned on. A movable terminal 48A of the automatic switch 48 is connected to the power source wire 20. A common terminal 48B is connected to an input terminal 70A of the first timer circuit 70 via a resistor 58. The first timer circuit 70 outputs a high level signal from the time when the automatic switch 48 is turned on (i.e., from the rise in the input signal). After a predetermined time t1 passes from the time the automatic switch 48 is turned off, the first timer circuit 70 outputs a low level signal. The predetermined time t1 is set to be the time necessary to completely close the window glass from a completely open state, or the time necessary to completely open the window glass from a completely closed state (in the present embodiment, this time is set to approximately 10 seconds).

The first timer circuit 70 has a reset terminal 70C which is connected to an output terminal 66C of an OR circuit 66. A first input terminal 66A of the OR circuit 66 is connected to an output: terminal 64C of an AND circuit 64. The AND circuit 64 has a first input terminal 64A, which is connected between the resistor 30 and the diode 34, and a second input terminal 64B, which is connected between the resistor 32 and the diode 36. A second input terminal 66B of the OR circuit 66 is connected to an output terminal 88B of a first motor lock detection circuit 88.

The first motor lock detection circuit 88 is a detection circuit formed of a comparator, a current-voltage conversion circuit and the like in order to detect the fully closed state of the window glass. An input terminal 88A of the first motor lock detection circuit 88 is connected to a terminal 18A (the side opposite the grounded side in FIG. 1) of the minute resistor 18. The first motor lock detection circuit 88 outputs a high level signal when the inputted current is a predetermined current I1 (in the present embodiment, 15±1A). The one terminal 18A of the minute resistor 18 is also connected to an input terminal 90A of a second motor lock detection circuit 90.

The second motor lock detection circuit 90 is a detection circuit formed of a comparator, a current-voltage conversion circuit and the like in order to detect if a foreign object is caught between the window glass and the window frame when the window glass is being raised. The second motor lock detection circuit 90 outputs a high level signal when the inputted current is a predetermined current I2 (in the present embodiment, 7±1A). An output terminal 90B of the second motor lock detection circuit 90 is connected to a second input terminal 68B of an OR circuit 68. An output terminal 68C of the OR circuit 68 is connected to a second input terminal 86B of an AND circuit 86. The first input terminal 68A is connected between the resistor 30 and the diode 34 via a third timer circuit 74. The third timer circuit 74 is a timer for monitoring the time over which the window glass is continuously raised. The third timer circuit 74 may be a fall one-shot signal generating circuit which is structured to output a high level pulse signal (e.g., having a pulse width of about 10 msec) after a predetermined time t3 (in the present embodiment, approximately 10 seconds) has passed from the start of the raising of the window glass. Alternatively, the third timer circuit 74 may be a delay circuit which is structured to output a high level signal after the predetermined time t3 has passed from the start of the raising of the window glass.

A first input terminal 86A of the AND circuit 86 is connected to the output terminal 60C of the OR circuit 60. A third output terminal 86C is connected to a terminal 96A of a complete-close sensor 96, which, for example, is disposed in a vicinity of the upper end of the window frame of the vehicle. The terminal 96A is connected to the power source B via a resistor 94, and a terminal 96B is grounded. When the window glass is completely closed, the complete-close sensor 96 is turned on, and the terminals 96A, 96B are connected. When the window glass is completely closed, the third input terminal 86C of the AND circuit 86 is grounded via the complete-close sensor 96 and becomes a low level. At times other than those the third input terminal 86C is at a high level via the resistor 94.

An output terminal 86D of the AND circuit 86 is connected to input terminals 92A, 72A of the latch circuit 92 and a second timer circuit 72, respectively. The latch circuit 92 is formed from a flip-flop circuit or the like, and maintains an output signal at a high level at the rise of an input signal. The timer circuit 72 outputs a high level signal synchronously with the rise of an input signal, and delays a predetermined time t2 (e.g., 0.2 seconds) from the fall of the input signal, and outputs a low level signal for resetting the latch circuit 92. An output terminal 72B of the timer circuit 72 is connected to a second input terminal 84B of the AND circuit 84 via an inverter 85. The first input terminal 84A of an AND circuit 84 is connected to the first input terminal 60A of the OR circuit 60 via an inverter 83. An output terminal 84C of the AND circuit 84 is connected to a reset terminal 92C of the latch circuit 92. Accordingly, when the output signal of the AND circuit 84 becomes a high level, the latch circuit 92 is reset, and the output signal of the latch circuit 92 becomes a low level.

Operation of the present embodiment will be described hereinafter together with operation of the logic circuit 100 with reference to the time charts in FIGS. 2A through 2F and 3A through 3D. First, when the window glass is raised from a stopped state, the occupant pushes (turns on) the manual switch 50 for raising the window glass. Accordingly, as illustrated in FIG. 2A, a high level signal is supplied to the first input terminal 60A of the OR circuit 60 via the resistor 54. A high level signal is input to the second input terminal 82B of the AND circuit 82.

When the manual switch 50 is pushed, both terminals of the motor 12 are grounded via the minute resistor 18 because both of the relay circuits 22, 24 are not energized. Accordingly, because the signal between the resistor 32 and the diode 36 is at a low level, the output signal of the AND circuit 80 is at a low level. The low level signal outputted from the AND circuit 80 is inverted by the inverter 81 so that a high level signal is input to the first input terminal 82A of the AND circuit 82. Accordingly, the output signal of the AND circuit 82 becomes a high level, and the transistor 26 is turned on by this high level signal. Due to the transistor 26 being turned on, the coil 22 of the relay circuit 14 is energized and the second contact 14C switches. The motor 12 is driven forward, and the window glass is raised.

When the operating amount of the manual switch 50 is large and the automatic switch 48 is turned on, a high level signal is input via the resistor 58 to the input terminal 70A of the first timer circuit 70 by electric power when the unillustrated ignition switch is turned on. The first timer 70 outputs a high level signal to the AND circuits 76, 78 for the predetermined time t1 from the rise of the input signal. When the window glass is rising, the signal between the resistor 30 and the diode 34 is at a high level, and a high level signal is output to the AND circuit 76. Accordingly, the transistor 26 is held continuously on until the output signal from the first timer circuit 70 becomes a low level signal. The motor 12 is driven forward by the coil 22 being energized, and the rising of the window glass continues.

If the manual switch 52 for lowering the window glass is turned on while the window glass is rising due to the automatic switch 48 having been turned on, the signal between the resistor 30 and the diode 34 and the signal between the resistor 32 and the diode 36 both become high level signals. The AND circuit 64 outputs a high level signal to the first timer circuit 70 via the OR circuit 66. Accordingly, the first timer circuit 70 is reset and outputs a low level signal. The output signals of the AND circuits 76, 82 become low level signals. Due to the transistors 26, 28 being turned off, the coils 22, 24 become non-energized, and the rotation of the motor 12 is stopped.

While the motor 12 is rotating, the current flowing through the motor 12 is detected at the motor lock detection circuits 88, 90. When the rising window glass is completely closed, the motor 12 is overloaded, and excess current I1 (e.g., 15A) is generated. The first motor lock detection circuit 88 outputs a high level signal to the first timer circuit 70 via the OR circuit 66. Accordingly, the first timer circuit 70 is reset, and in the same way as described above, the output signals of the AND circuits 76, 82 become low level signals. The coil 22 becomes non-energized, and the rotation of the motor 12 stops.

If the window glass continues to rise when an obstacle such as a foreign object or the like exists along the path of the rising window as it is being closed, the rising of the window glass is impeded before the window glass is completely closed, and the foreign object may become caught between the window glass and the window frame. Due to the foreign object becoming caught, the motor 12 is overloaded, and abnormal current I2 (e.g., 7A) is generated (see FIG. 2B). The second motor lock detection circuit 90 outputs a high level signal to the AND circuit 86 via the OR circuit 68 (FIG. 2C). At this time, the complete-close sensor 96 is off. Because the window glass is being raised, the output signal of the OR circuit 60 is a high level signal. Therefore, high level signals are input to the respective input terminals 86A, 86B, 86C of the AND circuit 86. Accordingly, the AND circuit 86 outputs a high level signal to the latch circuit 92 and the second timer circuit 72. At the rise of this signal, the latch circuit 92 outputs a high level signal to the AND circuit 80 and the OR circuit 62.

Due to the OR circuit 62 outputting a high level signal, the transistor 28 is turned on and the coil 24 is energized. Due to the energization of the coil 24, the second contact 16C of the relay circuit 16 switches, and power is supplied to the terminal 12B of the motor 12. Both terminals 12A, 12B of the motor 12 are connected to the power source, and the motor 12 is stopped. On the other hand, the AND circuit 80 outputs a high level signal due to the inputting of a high level signal, which is caused by power being supplied to the terminal 12B of the motor 12, and due to the inputting of a high level signal, which is output from the latch circuit 92. Accordingly, a low level signal is input to the AND circuit 82 via the inverter 81, and the AND circuit 82 outputs a low level signal so that the transistor 26 is turned off. The coil 22 becomes non-energized, and the first contact 14B of the relay circuit 14 is switched. The terminal 12A of the motor 12 becomes the grounded side, and accordingly, the motor 12 is driven in reverse so that the window glass begins to be lowered.

Due to the reverse rotation of the motor 12, the overloaded state of the motor 12 is canceled, and the motor lock detection circuit 90 outputs a low level signal. At this time, as described above, because the OR circuit 60 outputs a low level signal, the input signal of the AND circuit 86 is low level. The output signal of the AND circuit 86 falls to a low level. As illustrated in FIG. 2D, the second timer circuit 72 delays by the predetermined time t2 from the falling time of the output signal of the AND circuit 86, and the second timer circuit 72 outputs a low level signal. Accordingly, a high level signal is input to the second input terminal 84B of the AND circuit 84 via the inverter 85. At this time, if the manual switch 50 for raising the window glass is continuously pressed, the signal inputted to the input terminal 84A of the AND circuit 84 via the inverter 83 is a low level signal (FIG. 2E). Therefore, the AND circuit 84 outputs a low level signal, and the latch circuit 92 is not reset. Accordingly, the signal outputted by the latch circuit 92 is still a high level signal, and the reverse rotation of the motor 12 continues. When the manual switch 50 for raising is turned off, each of the signals inputted to the AND circuit 84 are high level signals, and the latch circuit 92 is reset (FIG. 2F). The signal outputted by the latch circuit 92 becomes a low level signal. Accordingly, the signal outputted by the OR circuit 62 becomes a low level signal. The transistor 28 is turned off, and the coil 24 becomes non-energized. The first contact 16B of the relay circuit 16 switches, and both terminals of the motor 12 are grounded. The rotation of the motor 12 is stopped, and the lowering of the window glass is stopped.

When a foreign object is caught between the window glass and the window frame, and, for example, the occupant realizes this and turns the manual switch 50 for raising off, a high level signal is input to the AND circuit 62 via the inverter 83. The signal outputted from the second timer circuit 72 is delayed by the predetermined time t2, and becomes a low level signal. Therefore, even if the manual switch 50 is turned off, the latch circuit 92 outputs a high level signal for the predetermined time t2 so that the motor 12 is rotated in reverse. Accordingly, the window glass is lowered for a predetermined time and stopped.

In this way, even if there is a foreign object along the path of the rising window glass and the foreign object is caught between the window glass and the window frame, the motor can rotate in reverse.

Further, when the manual switch 50 for raising is turned on, as illustrated in FIG. 3B, the third timer circuit 74 outputs a pulse signal after a predetermined time t3 (t3<t1 and t3 is approximately 10 seconds). Accordingly, when the window glass is not completely closed after approximately 10 seconds have passed since the manual switch 50 for raising is turned on, all of the input signals of the AND circuit 86 become high level signals. The AND circuit 86 outputs a high level signal, and the latch circuit 54 outputs a high level signal. Accordingly, in the same manner as described above, the transistor 28 is turned on, and the coil 24 is energized so that the terminal 12B of the motor 12 becomes a high level. The transistor 26 is turned off, and the coil 22 becomes non-energized. The motor 12 is rotated reversely, and the window glass begins to fall.

At this time, when the manual switch 50 is off, the signal inputted to the AND circuit 84 via the inverter 83 is a high level signal. The output signal of the second timer circuit 72 is delayed by a predetermined time t2 from the fall of the pulse signal outputted by the third timer circuit 74, and becomes a low level signal (FIG. 3C). Therefore, the latch circuit 92 is reset at the fall of the output signal of the second timer circuit 72. Due to the latch circuit 92 being reset, the transistor 28 is turned off, and the coil 24 is no longer energized. The motor 12 is stopped, and the lowering of the window glass is stopped.

If the manual switch 50 is continually pressed and is held on, the signal inputted to the AND circuit 84 via the inverter 83 is maintained at a low level. Therefore, a high level signal is continuously output without the latch circuit 92 being reset. As a result, the transistor 28 remains on, and the reverse rotation of the motor 12 continues so that the lowering of the window glass continues.

Accordingly, as in a case when there is a soft foreign object on the path along which the window glass is raised or when the window glass is urged by a foreign object, even if the raising of the window glass has not been completed within the predetermined time (about 10 seconds), the motor rotates in reverse. Further, even if an overload current of the motor 12 cannot be detected or the motor lock detection circuits 88, 90 are damaged, by detecting the raising time of the window glass, the existence of a foreign object along the path of the rising window glass can be detected, and the motor can be rotated in reverse.

Next, equivalent circuits of a logic circuit used to drive the relays 14, 16 of FIG. 1, which is a block diagram of a schematic structure of the power window driving control device 10, will be described.

Figure 5:
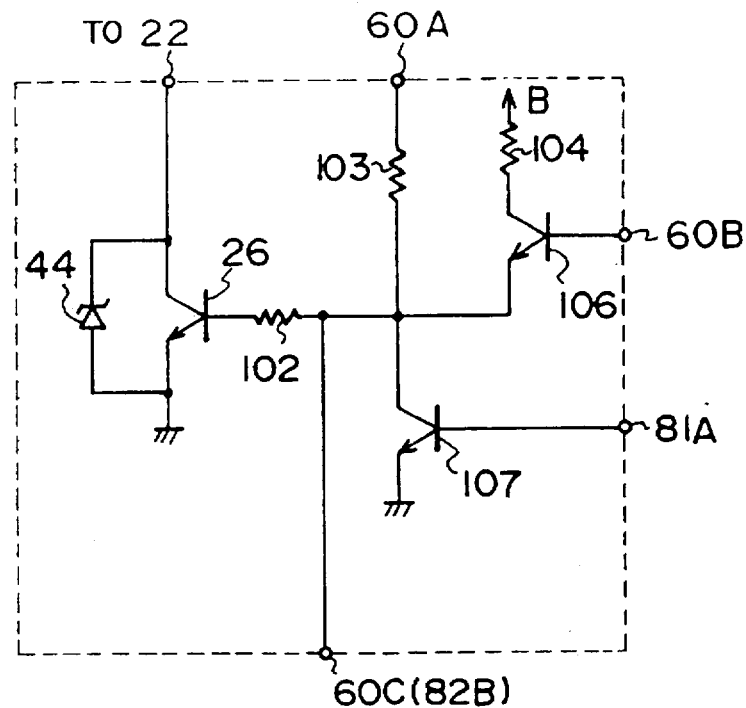
FIG. 5 is a circuit diagram of a first example of an equivalent circuit of a relay circuit peripheral logic circuit for raising the window glass in the power window driving control device illustrated in FIG. 1.

FIG. 5 illustrates a logic circuit portion for operating the first relay 14 for raising the window glass. Namely, FIG. 5 shows an equivalent circuit of a circuit formed by the Zener diode 44, the transistor 26, the AND circuit 82, the OR circuit 60 and the inverter 81.

The input terminal which is equivalent to the first input terminal 60A of the OR circuit 60 is connected to an emitter of a transistor 106 via a resistor 103. The input terminal which is equivalent to the second input terminal 60B is connected to the base of the transistor 106. The collector of the transistor 106 is connected via a resistor 104 to the power source B serving as a low voltage power source. The emitter of the transistor 106 is a terminal equivalent to the output terminal 60C of the OR circuit 60, and is connected via a resistor 102 to the base of the transistor 26 which was described previously, and is connected to the collector of a transistor 107. The emitter of the transistor 107 is grounded, and the base of the transistor 107 serves as a terminal which is equivalent to the input terminal of the inverter 81.

Figure 6:
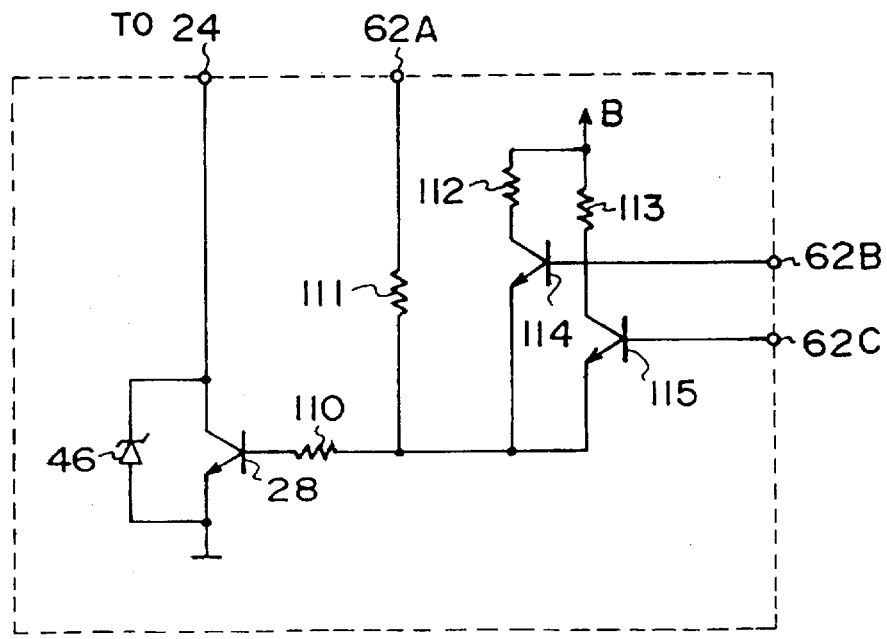
FIG. 6 is a circuit diagram of a first example of an equivalent circuit of a relay circuit peripheral logic circuit for lowering the window glass in the power window driving control device illustrated in FIG. 1.

FIG. 6 illustrates a logic circuit portion for operating the second relay 16 for lowering the window glass. Namely, FIG. 6 shows an equivalent circuit of a circuit formed by the Zener diode 46, the transistor 28, and the OR circuit 62.

The input terminal equivalent to the first input terminal 62A of the OR circuit 62 is connected to the emitter of a transistor 115 via a resistor 111. The input terminal which is equivalent to the second input terminal 62B is connected to the base of a transistor 114, and is connected to the emitters of the transistors 114, 115. The input terminal equivalent to the third input terminal 62C is connected to the base of the transistor 115. The respective collectors of the transistors 114, 115 are connected via resistors 112, 113 to the power source B which serves as a low voltage power source. The respective emitters of the transistors 114, 115 are connected to the base of the transistor 28, which was described previously, via a resistor 110.

Figure 7:
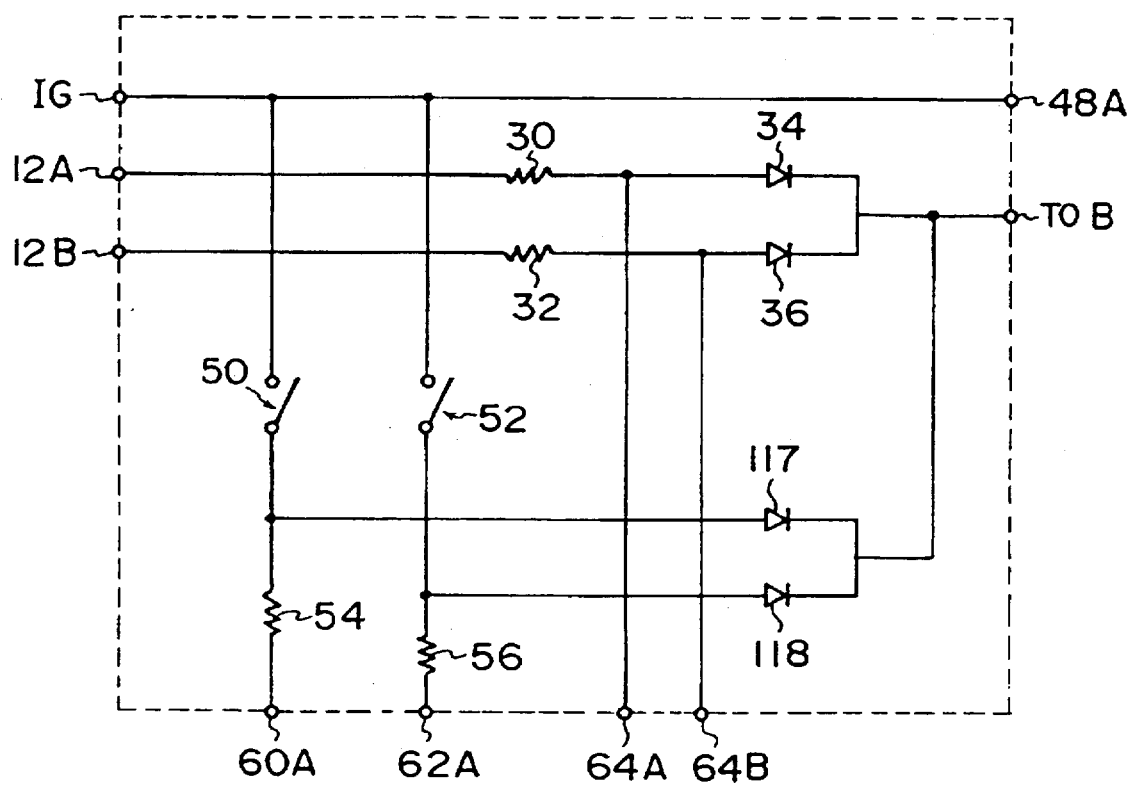
FIG. 7 is a circuit diagram illustrating another example of a periphery of a power source forming portion in the power window driving control device illustrated in FIG. 1.

A peripheral circuit of the power source B, which serves as a low voltage power source in the present embodiment, can be structured by adding diodes as illustrated in FIG. 7. Namely, the cathodes of diodes 34, 36, 117, 118 are connected together. The anode of the diode 117 is connected between the switch 50 and the resistor 54. The anode of the diode 118 is connected between the switch 52 and the resistor 56. In this way, when either of the switches 50, 52 is on, the power source B serving as a low voltage power source can be formed.

Accordingly, when either of the relay circuits 14, 16 is energized, an energized circuit structure can be formed. When the relays 14, 16 are not energized, a circuit structure without dark current can be formed.

The present embodiment has been described using an example in which the coils 22, 24 are energized or become non-energized in accordance with the logic of the logic circuit portion 100 in accordance with the on/off states of the switches. The second embodiment is an example in which the energization or the non-energization of the coils 22, 24 is turned on and off directly by the manual switches 50, 52. In the second embodiment, parts which are the same as those in the first embodiment are denoted by the same reference numerals, and description thereof is omitted.

Figure 4:
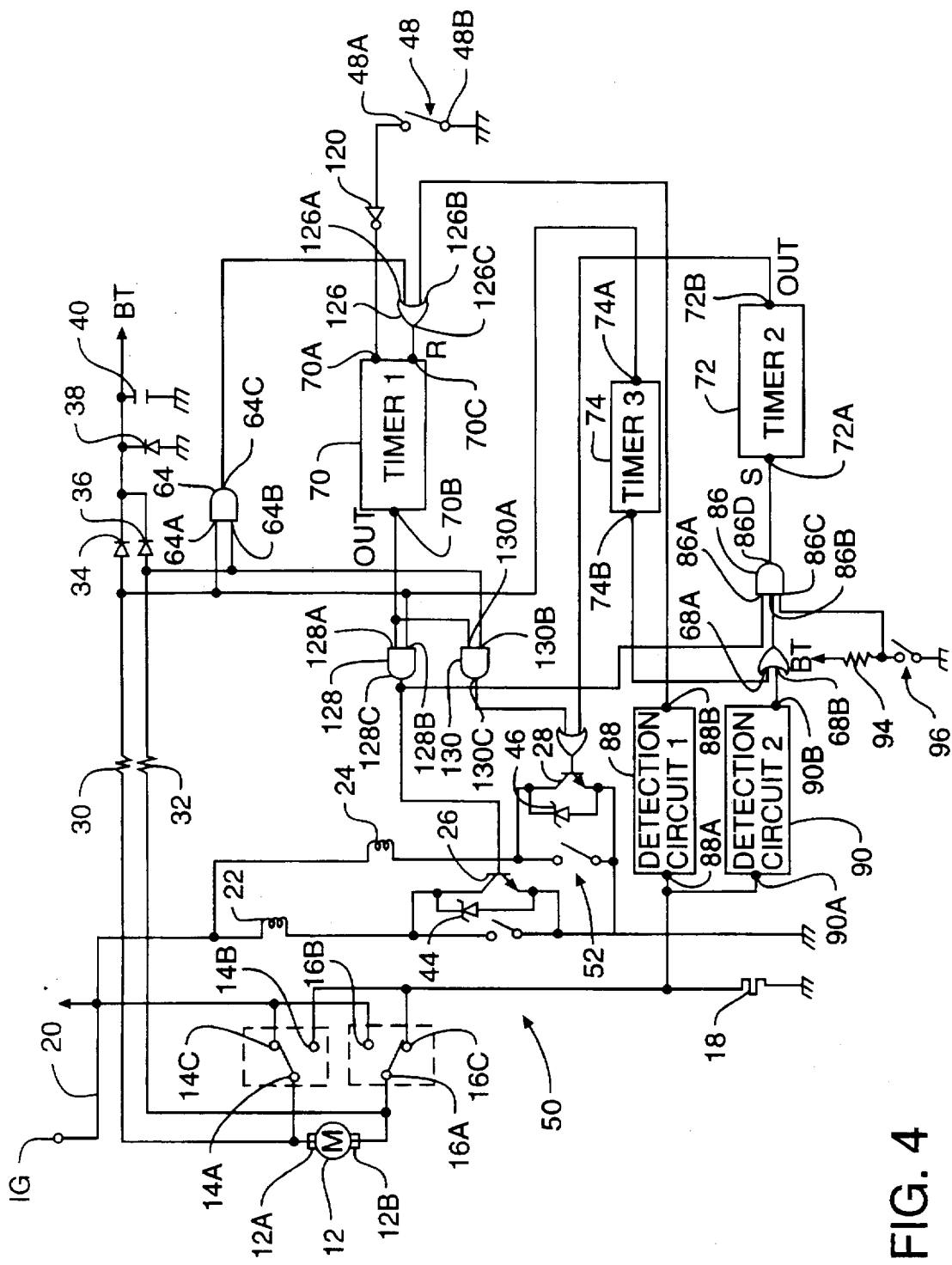
FIG. 4 is a block diagram of a second embodiment of a power window driving control device.

As illustrated in FIG. 4, one terminal of the first coil 22 is connected to the power source wire 20. The other terminal of the first coil 22 is grounded via the manual switch 50 for raising the window glass. In the same way, the other terminal of the second coil 24 is grounded via the manual switch 52 for lowering the window glass. Accordingly, when the manual switch 50 is pushed and is turned on, the first coil 22 is energized and the second contact 14C switches so that the motor 12 is rotated forward. Further, when the manual switch 52 is pushed and is turned on, the second coil 24 is energized and the second contact 16C switches so that the motor 12 is rotated in reverse.

As in the previously-described embodiment, the automatic switch 48, which is driven mechanically, is mounted to the automatic switch 50 for raising the window glass and the automatic switch 52 for lowering the window glass. The movable terminal 48A of the automatic switch 48 is connected to the input terminal 70A of the first timer 70 via an inverter 120. When the automatic switch 48 is pushed, the first timer circuit 70 outputs an automatic signal. After the automatic switch 48 is turned off, the first timer circuit 70 outputs a high level signal for a predetermined time. The output terminal 70B of the first timer circuit 70 is connected to a first input terminal 128A of an AND circuit 128 and to a first input terminal 130A of an AND circuit 130. A first input terminal 126A of an OR circuit 126 is connected to the output terminal 64C of the AND circuit 64 having the same structure as in the previous embodiment. An output terminal 126C of the OR circuit 126 is connected to the reset terminal 70C of the first timer circuit 70.

A second input terminal 128B of the AND circuit 128 is connected between the resistor 30 and the diode 34. A second input terminal 130B of the AND circuit 130 is connected between the resistor 32 and the diode 36. The output terminals 128C, 130C of the AND circuits 128, 130 are connected to the bases of the transistors 26, 28. Accordingly, when the first timer circuit 70 outputs an automatic signal, a signal obtained by the logical product of either of the AND circuits 128, 130 in accordance with the rotation of the motor 12, i.e., in accordance with the raising or lowering of the window glass, becomes a high level signal, and either of the corresponding transistors 26, 28 is turned on.

The output terminal 88B of the first motor lock detection circuit 88 is connected to a second input terminal 126B of the OR circuit 126 in order to cancel the automatic signal when the window glass is completely closed.

An input terminal 74A of the third timer circuit 74 is connected between the resistor 30 and the diode 34. As in the previously-described embodiment, the third timer circuit 74 is a fall one-shot signal generating circuit or a delay circuit for monitoring the time over which the window glass is continuously raised. After the predetermined time t3 (about 10 seconds in the present embodiment) passes after the window glass begins to rise, a high level pulse signal (e.g., pulse width of approximately 10 msec) or a high level signal is output.

Accordingly, when the automatic switch 48 is pushed and the window glass begins to rise and the window glass is not completely closed even though the predetermined time t3 has elapsed, the second timer circuit 72 outputs a high level signal due to the pulse signal outputted by the third timer circuit 74. The transistor 28 is thereby turned on. At this time, the signal obtained by the logical product of the AND circuit 64 becomes a high level signal due to the transistors 26, 28 being on. The first timer circuit 70 is reset through the OR circuit 126. Accordingly, the transistor 26 is turned off, and only the transistor 28 is on. The motor 12 is driven in reverse, and the window glass is lowered.

In this way, in the second embodiment, the motor is rotated directly by the on/off states of the manual switches. Even if the window glass is raised and lowered automatically, a foreign object located on the path along which the window glass is raised does not continue to be caught between the window glass and the window frame.

The first and second embodiments describe cases in which the window glass is moved vertically. However, the present invention is not limited to the same and may easily be applied to a case in which a window glass is moved horizontally, such as a sunroof provided at the upper portion of a vehicle. The present invention can also easily be applied to cases in which a window glass is moved in an inclined direction or a transverse direction.

A third embodiment of the present invention will be described hereinafter. Parts which are the same as those in the first embodiment are described with the same reference numerals, and description thereof is omitted.

Figure 8:
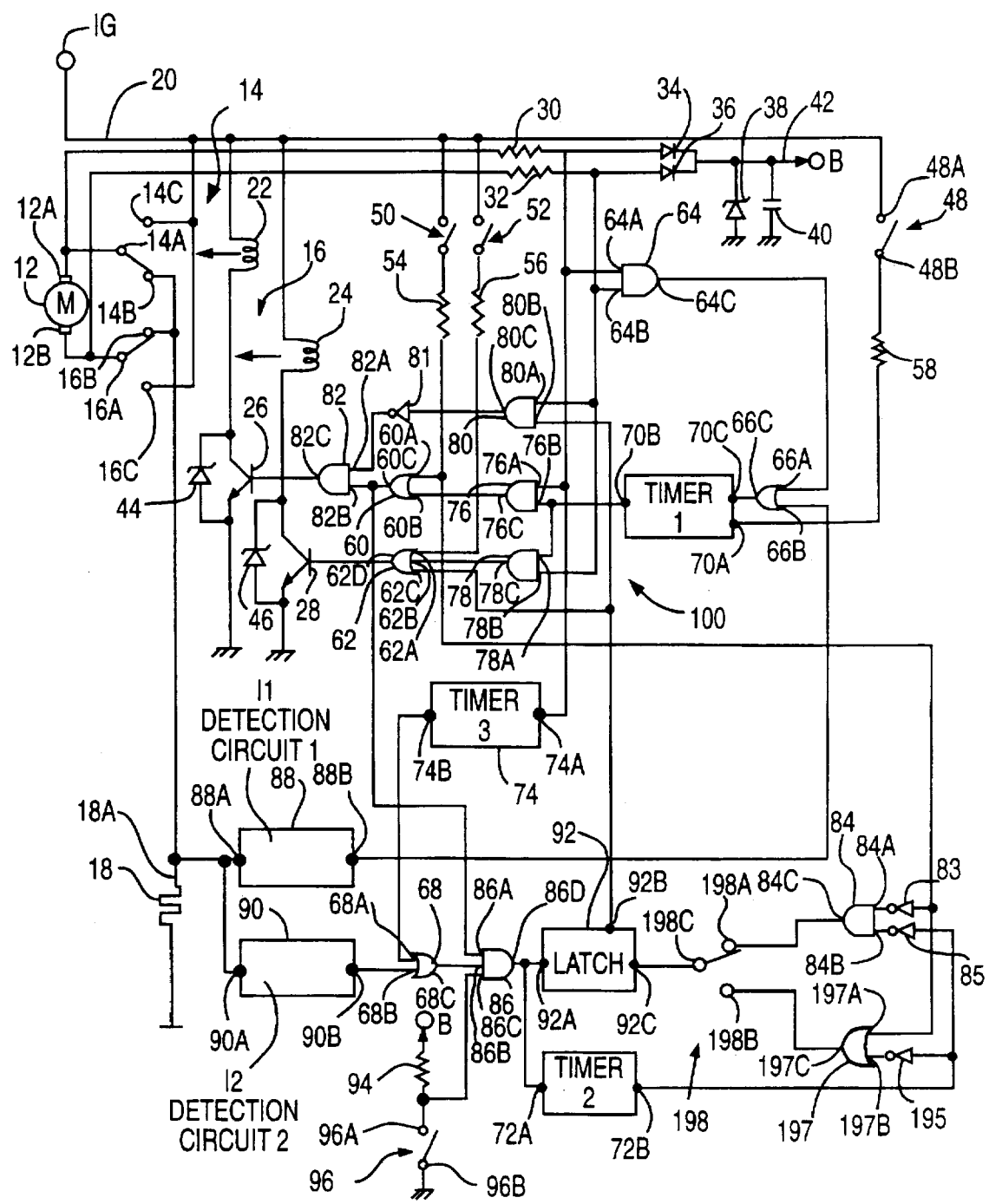
FIG. 8 is a block diagram illustrating a schematic structure of a power window driving control device relating to a third embodiment of the present invention.

In FIG. 8, a schematic structure of a power window driving control device 150 relating to the third embodiment is illustrated as a block diagram. The output terminal 68C of the OR circuit 68 is connected to the second input terminal 86B of the AND circuit 86. The first input terminal 68A is connected between the resistor 30 and the diode 34 via a third timer circuit 174. The third timer circuit 174 is a fall one-shot signal generating circuit for monitoring the time over which the window glass is raised continuously. After the predetermined period of time t3 (approximately 10 seconds in the present embodiment) has passed from the beginning of the raising of the window glass, the third timer circuit 174 outputs a high level pulse signal (e.g., having a pulse width of approximately 10 msec).

The output terminal 72B of the timer circuit 72 is bifurcated. One furcation is connected to the second input terminal 84B of the AND circuit 84 via the inverter 85. The other furcation is connected to a second input terminal 197B of an OR circuit 197 via an inverter 195.

The first input terminal 84A of the AND circuit 84 is connected to the first input terminal 60A of the OR circuit 60 via the inverter 83. The first input terminal 60A of the OR circuit 60 is connected to a first input terminal 197A of the OR circuit 197. The output terminal 84C of the AND circuit 84 and an output terminal 197C of the OR circuit 197 are connected to a first terminal 198A and a second terminal 198B of a changeover switch 198 which is structured as one circuit with two contacts. A common terminal 198C of the changeover switch 198 is connected to the reset terminal 92C of the latch circuit 92. Accordingly, in a case in which the changeover switch 198 is switched to the first contact 198A side, when the output signal of the AND circuit 84 becomes a high level signal, the latch circuit 92 is reset, and the output signal of the latch circuit 92 becomes a low level signal. Further, in a case in which the changeover switch 198 is switched to the second contact 198B side, when the output signal of the OR circuit 197 becomes a high level signal, the latch circuit 92 is reset, and the output signal of the latch circuit 92 becomes a low level signal.

Operation of the present embodiment will be described hereinafter together with operation of the logic circuit 100 with reference to the time charts in FIGS. A2 through 3D.

Description will be given of operation to reverse the driving of the motor 12 when a foreign object is caught in a state in which the changeover switch 198 is switched to the first contact 198A side, i.e., when both the automatic switch 48 and the manual switch 50 are operated. Description will focus on portions which differ from those of the first embodiment.

If the window glass continues to rise when an obstacle such as a foreign object or the like exists along the path of the rising window as it is being closed, the rising of the window glass is impeded before the window glass is completely closed, and the foreign object may become caught between the window glass and the window frame. Due to the foreign object becoming caught, the motor 12 is overloaded, and abnormal current I2 (e.g., 7A) is generated (see FIG. 2B). The second motor lock detection circuit 90 outputs a high level signal to the AND circuit 86 via the OR circuit 68

(FIG. 2C). At this time, the complete-close sensor 96 is off. Because the window glass is being raised, the output signal of the OR circuit 60 is a high level signal. Therefore, high level signals are input to the respective input terminals 86A, 86B, 86C of the AND circuit 86. Accordingly, the AND circuit 86 outputs a high level signal to the latch circuit 92 and the second timer circuit 72. At the rise of this signal, the latch circuit 92 outputs a high level signal to the AND circuit 80 and the OR circuit 62.

A high level signal from the forward rotation of the motor 12 and a high level signal outputted from the latch circuit 92 are inputted to the AND circuit 80. The AND circuit 80 thereby outputs a high level signal. Accordingly, a low level signal is inputted to the AND circuit 82 via the inverter 81. The AND circuit 82 outputs a low level signal, and the transistor 26 is turned off. The coil 22 thereby becomes non-energized, and the first contact 14B of the relay circuit 14 switches, and the motor 12 stops.

Due to the OR circuit 62 outputting a high level signal, the transistor 28 is turned on, and the coil 24 is energized. Due to the energization of the coil 24, the second contact 16C of the relay circuit 16 switches, and power is supplied to the terminal 12B of the motor 12. Accordingly, the motor 12 is rotated in reverse, and the window glass begins to fall.

In this way, in a state in which the first contact 198A of the changeover switch 198 is switched, even if an occupant continues to operate the manual switch 50 (designating the closing of the window glass), when a foreign object becomes caught between the window glass and the window frame, the window glass is lowered. The operation of the window glass is opposite the intent of the occupant. Depending on the case, an operation which is opposite the intent of the occupant may result in drawbacks.

Therefore, in the present embodiment, the changeover switch 198 is provided. By switching the changeover switch 198 to the second contact 198B side, when the manual switch 50 is operated, the window glass can be operated in accordance with the intent of the occupant.

Namely, when the changeover switch 198 switches to the second contact 198B side, a high level signal is always outputted from the output terminal 197C of the OR circuit 197 during the time that the manual switch 50 is operated so that the reset state of the latch circuit 92 can be maintained. As a result, even if a high level signal is output from the output terminal 84C of the AND circuit 84, a high level signal is not output from the output terminal 92B of the latch circuit 92, and the motor 12 is not rotated in reverse. Accordingly, operation of the window glass continues in the direction of closing the window glass.

In the present embodiment, by the changeover operation of the changeover switch 198, a selection can be made as to whether the closing operation of the window glass when the manual switch is operated is to be in accordance with the intent of the occupant or whether the motor is to be operated in reverse (lowering of the window glass) when a foreign object is caught regardless of the intent of the occupant.

The third embodiment describes a case in which the window glass is moved vertically. However, the present invention is not limited to the same and may easily be applied to a case in which a window glass is moved horizontally, such as a sunroof provided at the upper portion of a vehicle. The present invention can also easily be applied to cases in which a window glass is moved in an inclined direction or a transverse direction.

A fourth embodiment of the present invention will now be described. In the fourth embodiment, parts which are the same as those of the first embodiment are denoted with the same reference numerals, and description thereof is omitted.

Figure 9:
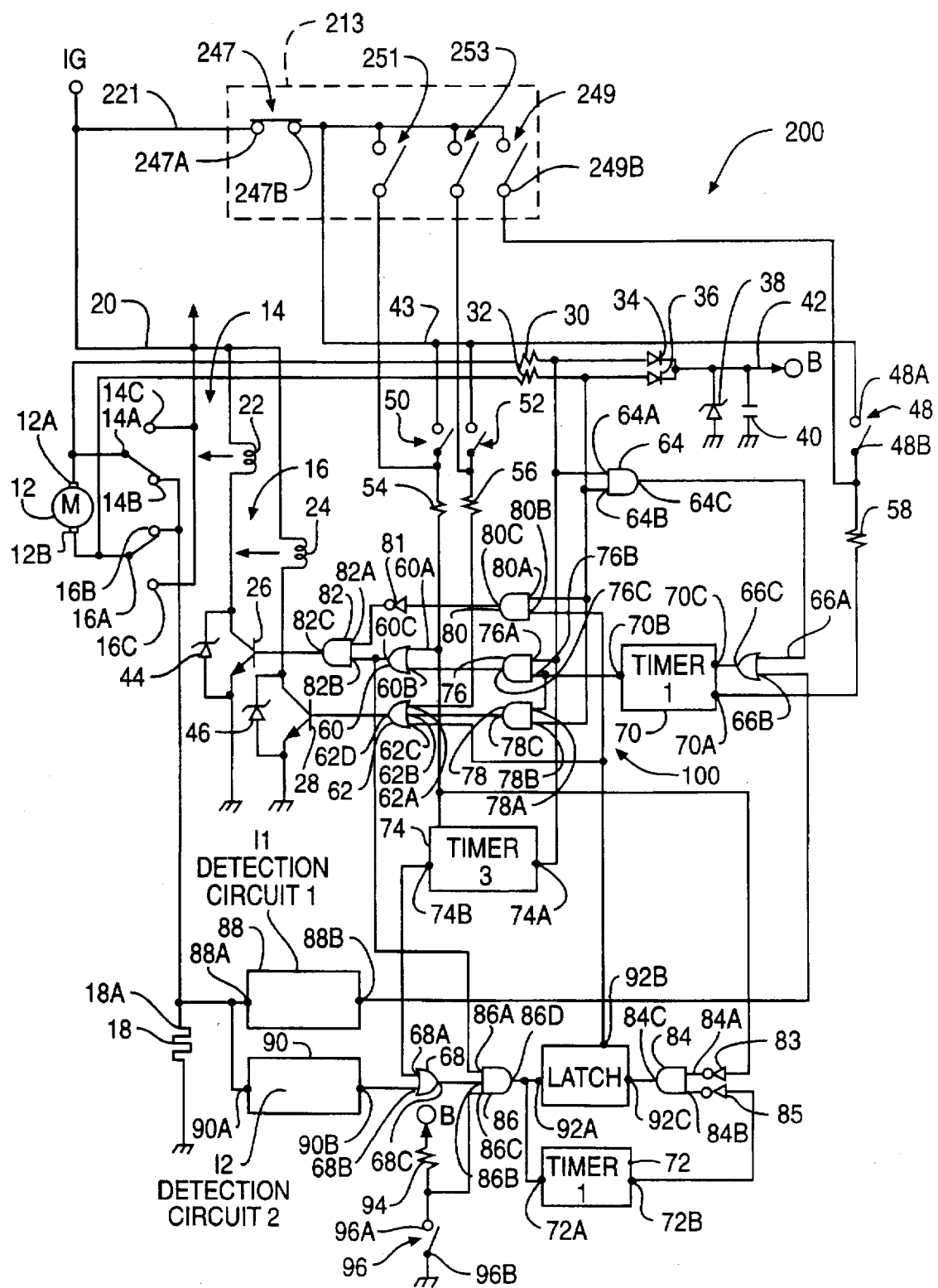
FIG. 9 is a block diagram illustrating a schematic structure of a power window driving control device relating to a fourth embodiment of the present invention.

In FIG. 9, a schematic structure of a power window driving control device 200 relating to the fourth embodiment is illustrated as a block diagram.

When electric power is supplied to at least one of the terminals 12A, 12B so that the motor 12 is rotated (including breaking during rotation), power is supplied to the power source wire 42 via the resistor 30 and the diode 34 or via the resistor 32 and the diode 36. A power source B serving as a low voltage power source is formed at the power source wire 42 by the Zener diode 38 and the capacitor 40.

A terminal 247A of a window lock switch 247 of a window glass raising/lowering designation switch 213, which is disposed on the driver's side and designates raising/lowering of the front passenger's window glass, is connected to the power source wire 20 via a power source wire 221. The window glass raising/lowering designation switch 213 is formed from the window lock switch 247, a raising switch 251, a lowering switch 253, and an automatic switch 249.

The window lock switch 247 is structured such that even if the raising/lowering of the front passenger's side window glass is designated, power is not supplied from the battery BT so that the motor does not rotate. Namely, when the window lock switch 247 is turned on, the window lock switch 247 is in an interrupted state (the contacts of both terminals are open).

Further, respective ones of terminals of the raising switch 251, the lowering switch 253, and the automatic switch 249 are connected to another terminal 247B of the window lock switch 247. The power source wire 43 is connected to the other terminal 247B of the window lock switch 247. Respective ones of terminals of the manual switch 50 for raising the window glass and the manual switch 2 for lowering the window glass, which are disposed at the front passenger's side, are connected to the power source wire 43. The other terminal of the driver's side raising switch 251 and the other terminal of the front passenger's side manual switch 50 are connected together, and are connected to the first input terminal 60A of the OR circuit 60 via the resistor 54. Further, the other terminal of the driver's side lowering switch 253 and the other terminal of the front passenger's side window glass lowering switch 52 are connected together, and are connected to the first input terminal 62A of the OR circuit 62 via the resistor 56.

Accordingly, designations for raising and lowering the front passenger's window glass can be given from both the driver's side and the front passenger's side.

The automatic switch 48 is mounted to the manual switch 50 for raising the window glass on the front passenger's side and the manual switch 52 for lowering the window glass on the front passenger's side. The automatic switch 48 is driven mechanically so as to be turned on when the operating amounts by which the manual switches 50, 52 are pushed is great. For example, when the operating amount of the manual switch 50 for raising the window glass is small, the manual switch 50 is on, and the automatic switch 48 is off. When the operating amount of the manual switch 50 is large, both the manual switch 50 and the automatic switch 48 are turned on. Further, the automatic switch 249 is mounted to the raising switch 251 and the lowering switch 253, which are used to designate the raising and lowering of the front passenger's side window glass at the driver's side. The automatic switch 249 is driven mechanically so as to be turned on when the operating amounts by which the manual switches 251, 253 are pushed are great. The common terminals 48B, 249B of the automatic switches 48, 249, respectively, are connected via the resistor 58 to the input terminal 70A of the first timer circuit 70 which will be described later. The movable terminal 48A of the automatic switch is connected to the power source wire 43.

Accordingly, designation for automatically raising and lowering the window glass on the front passenger's side can be given from both the driver's side and the front passenger's side.

The first timer circuit 70 outputs a high level signal from the time when the automatic switches 48, 249 are turned on (the rise of the input signal). After the predetermined time t1 has passed from the time when the automatic switches 48, 249 are turned off, the first timer circuit 70 outputs a low level signal. The predetermined time t1 is set to be the time necessary to completely close the window glass from a completely open state, or the time necessary to completely open the window glass from a completely closed state (in the present embodiment, this time is set to approximately 10 seconds).

Figure 2:
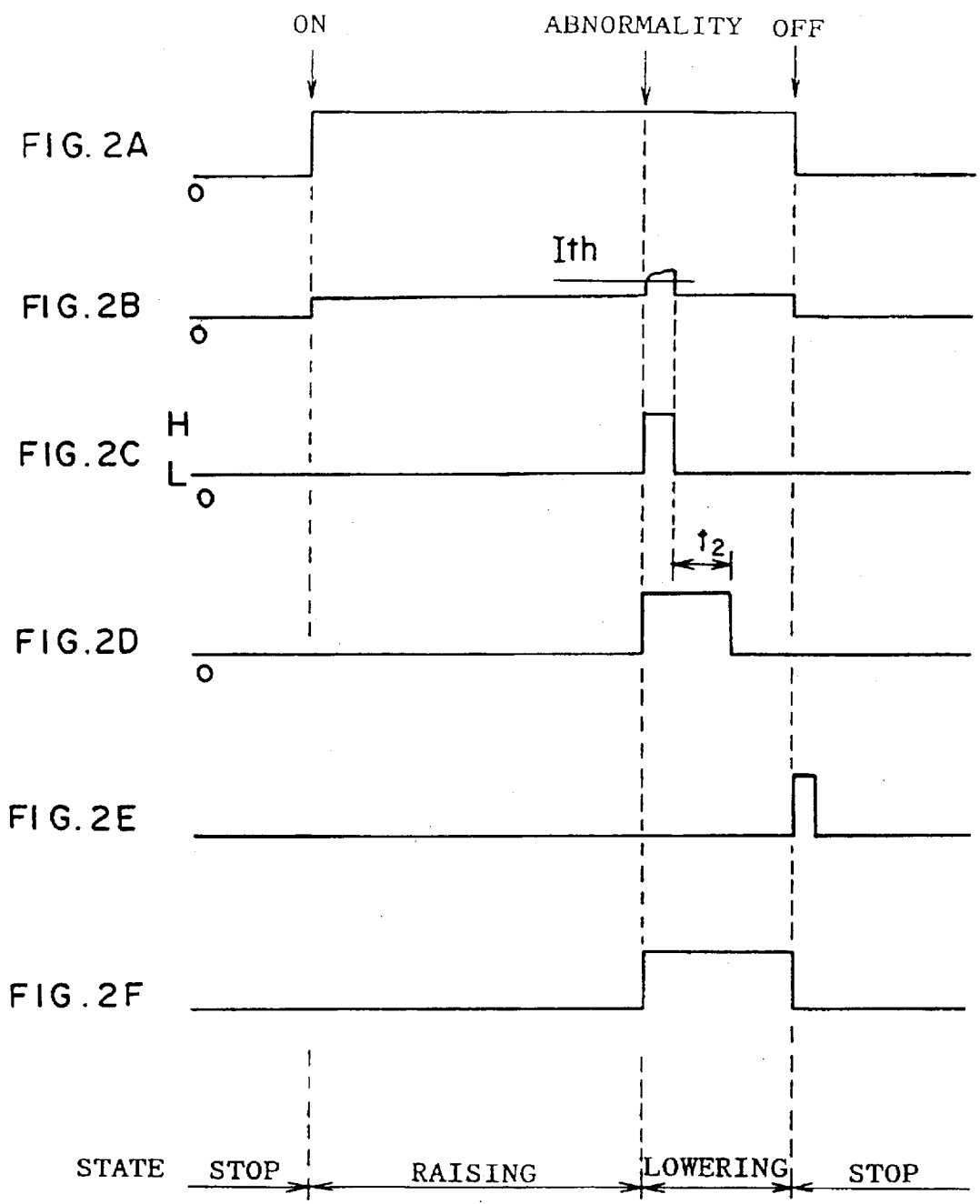
FIGS. 2A through 2F are time charts of the power window driving control device when overload current is flowing to a motor when a window glass is being raised.
Figure 3:
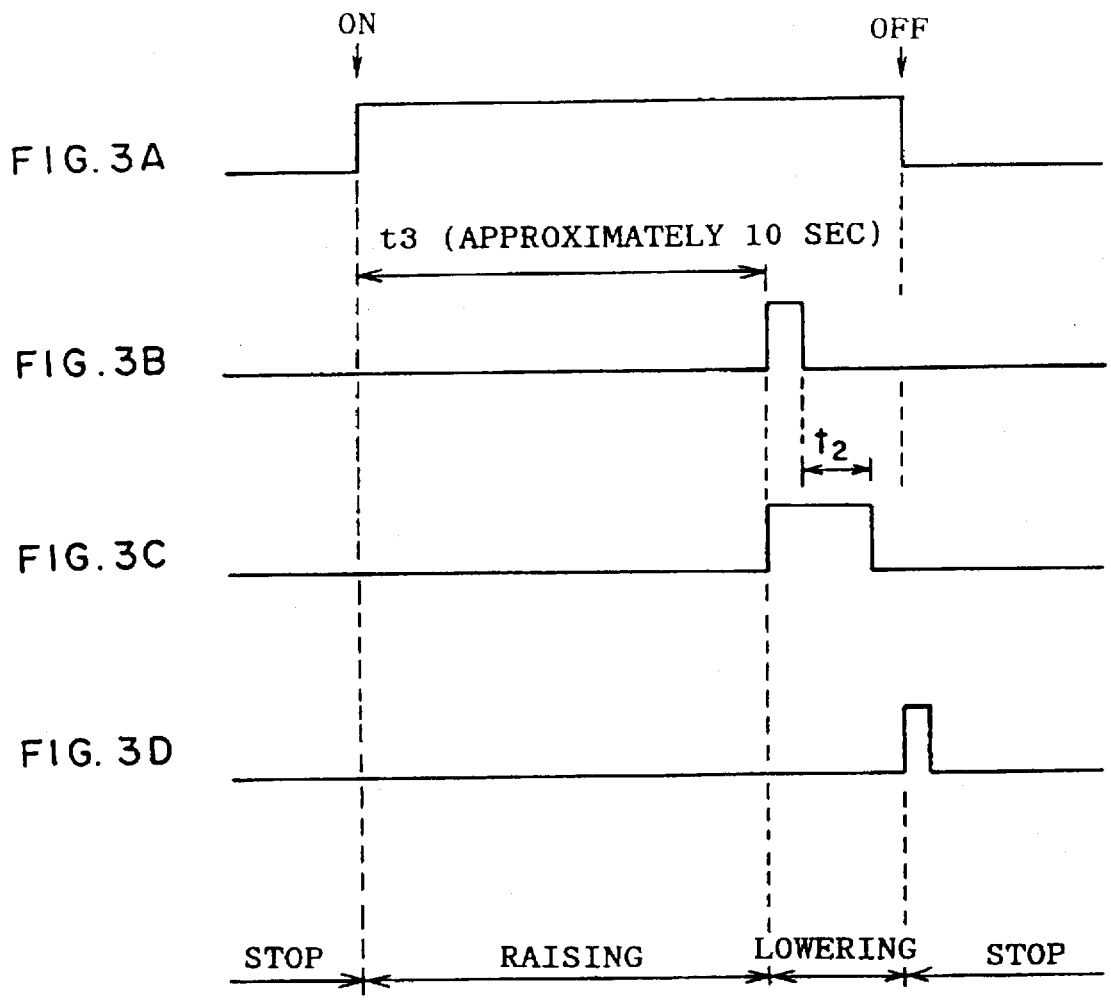
FIGS. 3A through 3D are time charts of the power window driving control device when the window glass is raised continuously for a predetermined time.

Hereinafter, operation of the present embodiment will be described together with the operation of the logic circuit 100 with reference to the time charts in FIGS. 2A through 3D. First, the raising of the front passenger's side window glass is indicated by the driver pushing (turning on) the raising switch 251 or by the front passenger pushing (turning on) the manual switch 50 for raising the window glass. As illustrated in FIG. 2A, a high level signal is supplied to the first terminal 60A of the OR circuit 60 via the resistor 54, and a high level signal is input to the second input terminal 82B of the AND circuit 82.

When the raising switch 251 or the manual switch 50 is pushed, the relay circuits 22, 24 both become non-energized. Therefore, both terminals of the motor 12 are grounded through the minute resistor 18. Accordingly, because the signal between the resistor 32 and the diode 36 is low level, the output signal of the AND circuit 80 is low level. The low level signal outputted from the AND circuit 80 is inverted by the inverter 81, and a high level signal is input to the first input terminal 82A of the AND circuit 82. The output signal of the AND circuit 82 becomes a high level signal, and the transistor 26 is turned on by this high level signal. Due to the transistor 26 being turned on, the coil 22 of the relay circuit 14 is energized, and the second contact 14C is switched. The motor 12 is rotated forward, and the window glass is raised.

When the operating amount of the raising switch 251 or the manual switch 50 is large and either of the automatic switches 48, 249 is on, a high level signal, which is caused by electric power when an unillustrated ignition switch is turned on, is input to the input terminal 70A of the first timer circuit 70 via the resistor 58. In this case, the window lock switch 247 is off, and the power source wire 43 is connected to the terminal IG via the power source wire 221. The first timer circuit 70 outputs a high level signal to the AND circuits 76, 78 at a predetermined time t1 from the rise of the input signal. When the window glass is raised, the signal between the resistor 30 and the diode 34 becomes a high level signal, and the AND circuit 76 outputs a high level signal. Accordingly, the transistor 26 remains on until the output signal from the first timer circuit 70 becomes a low level signal. Due to the energization of the coil 22, the motor 12 is rotated forward, and the raising of the window glass continues.

While the front passenger's window glass is being raised due to either of the automatic switches 48, 249 being turned on, if the manual switch 52 for lowering the window glass or the lowering switch 253 is turned on, both the signal between the resistor 30 and the diode 34 and the signal between the resistor 32 and the diode 36 become high level signals. The AND circuit 64 outputs a high level signal to the first timer circuit 70 via the OR circuit 66. The first timer circuit 70 is thereby reset and outputs a low level signal. Accordingly, the output signals of the AND circuits 76, 82 become low level signals. Due to the transistors 26, 28 being turned off, the coils 22, 24 become non-energized, and the rotation of the motor 12 stops.

If the window glass continues to rise when an obstacle such as a foreign object or the like exists along the path of the rising window as it is being closed, the rising of the window glass is impeded before the window glass is completely closed, and the foreign object may become caught between the window glass and the window frame. In the same way as in the first embodiment, the motor 12 is rotated reversely, and the lowering of the window glass begins. Due to the motor 12 being rotated reversely, the overloaded state of the motor 12 is canceled, and the motor lock detection circuit 90 outputs a low level signal. At this time, as described previously, the OR circuit 60 outputs a low level signal. Therefore, the input signal of the AND circuit 86 becomes a low level signal, and the output signal of the AND circuit 86 falls to a low level. As illustrated in FIG. 2D, the second time of circuit 72 delays by a predetermined time t2 from the time of the falling of the output signal of the AND circuit 86, and the second timer circuit 72 outputs a low level signal. Accordingly, a high level signal is inputted to the second input terminal 84B of the AND circuit 84 via the inverter 85. At this time, if the manual switch 50 for raising continues to be pressed, the signal input to the first input terminal 84A of the AND circuit 84 via the inverter 83 is a low level signal (FIG. 2E). Therefore, the AND circuit 84 outputs a low level signal, and the latch circuit 92 is not reset. Accordingly, the latch circuit 92 continues to output a high level signal, and the motor 12 continues to rotate in reverse. On the other hand, if either of the manual switch 50 for raising and the raising switch 251 is off, the signals input to the AND circuit 84 become high level signals, respectively, and the latch circuit 92 is reset (FIG. 2F). The signal output by the latch circuit 92 becomes a low level signal. Accordingly, the output signal of the OR circuit 62 becomes a low level signal, the transistor 28 is turned off, and the coil 24 becomes non-energized. Accordingly, the first contact 16B of the relay circuit 16 is switched, and both terminals of the motor 12 are grounded. The rotation of the motor 12 stops, and the lowering of the window glass stops.

When a foreign object becomes caught between the window glass and the window frame, the occupant may take notice and turn off the manual switch 50 for raising or the raising switch 251 which was being pressed. In this case, a high level signal is input to the AND circuit 62 via the inverter 83. The signal output from the second timer circuit 72 is delayed a predetermined time t2 and becomes a low level signal. Therefore, the latch circuit 92 outputs a high level signal for a predetermined time t2, and the motor 12 is driven in reverse. Accordingly, the window glass is lowered for a predetermined time and stops.

In this way, if there is a foreign object on the path along which the window glass is raised and the foreign object becomes caught between the window glass and the window frame, the motor can be rotated in reverse.

Further, when the manual switch 50 for raising or the raising switch 251 is on, the third timer circuit 74 outputs a pulse signal after a predetermined time t3 (t3<t1 and t3 is approximately 10 seconds) as illustrated in FIG. 3B. Accordingly, either the manual switch 50 for raising or the raising switch 251 is turned on. If the window glass is not completely closed after about 10 seconds, all of the input signals of the AND circuit 86 become high level signals. The AND circuit 86 outputs a high level signal, and the latch circuit 54 outputs a high level signal. Accordingly, in the same way as described above, the transistor 28 is turned on, the coil 24 is energized, and the terminal 12B of the motor 12 becomes a high level. The transistor 26 is turned off, and the coil 22 becomes non-energized. The motor 12 is rotated in reverse, and the lowering of the window glass begins.

At this time, if either the manual switch 50 or the raising switch 251 is off, the signal inputted to the AND circuit 84 via the inverter 83 becomes a high level signal. The output signal of the second timer circuit 72 is delayed by a predetermined time t2 from the fall of the pulse signal outputted by the third timer circuit 74, and becomes a low level signal (FIG. 3C). Therefore, the latch circuit 92 is reset at the fall of the output signal of the second timer circuit 72. Due to the resetting of the latch circuit 92, the transistor 28 is turned off, and the coil 24 becomes non-energized. The motor 12 stops, and the lowering of the window glass is stopped.

When either the manual switch 50 or the raising switch 251 continues to be pressed, the signal inputted to the AND circuit 84 via the inverter 83 is maintained at a low level. Therefore, output of a high level signal continues without the latch circuit 92 being reset. As a result, the on state of the transistor 28 continues, and the reverse rotation of the motor 12 continues. The lowering of the window glass continues.

Accordingly, as in a case when there is a soft foreign object on the path along which the window glass is raised or when the window glass is urged by a foreign object, even if the raising of the window glass has not been completed within the predetermined time (about 10 seconds), the motor rotates in reverse. Further, even if an overload current of the motor 12 cannot be detected or the motor lock detection circuits 88, 90 are damaged, by detecting the raising time of the window glass, the existence of a foreign object along the path of the rising window glass can be detected, and the motor can be rotated in reverse.

In accordance with the present embodiment, when the window glass at the front passenger's side of the vehicle is raised or lowered at the driver's side, even if a foreign object exists on the path along which the front passenger's window glass is raised and the driver does not realize this and attempts to raise the front passenger's side window glass, the motor can be rotated in reverse without the foreign object becoming caught between the window glass and the window frame. Accordingly, even if designations for raising and lowering of the same window glass can be given by a plurality of switches, the existence of a foreign object on the path along which the window glass is raised can be detected, and the motor can be rotated in reverse.

Figure 10:
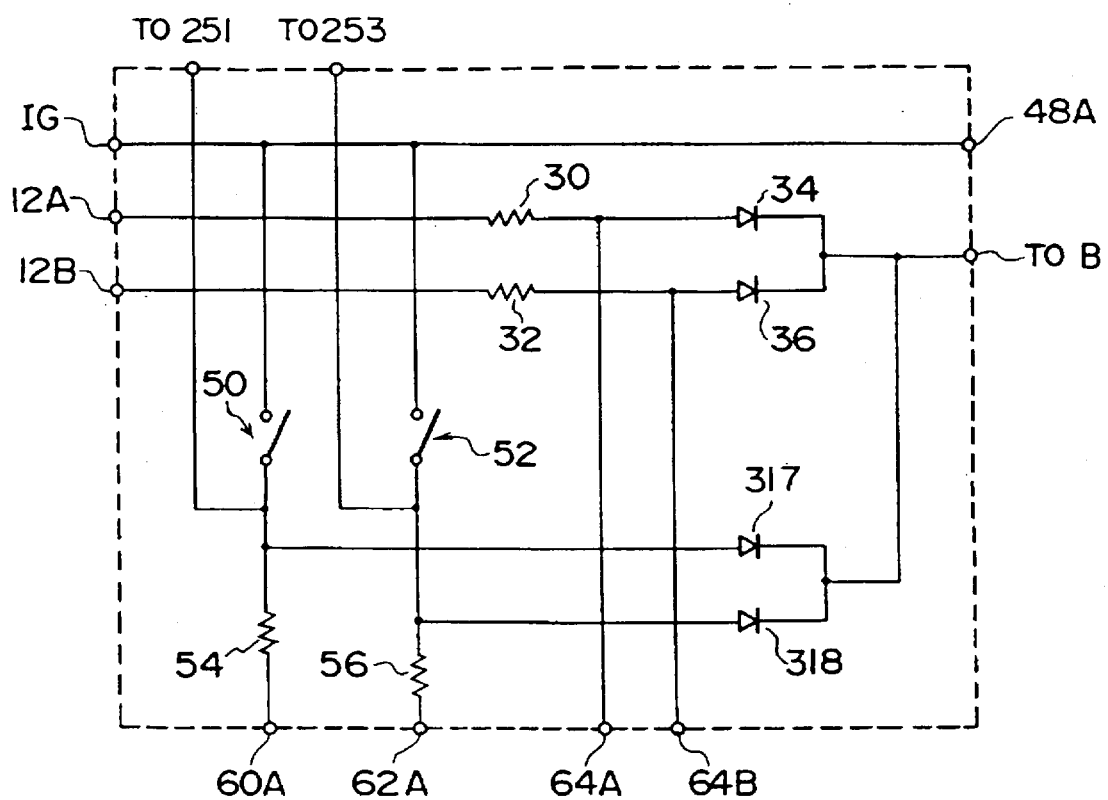
FIG. 10 is a circuit diagram illustrating another example of a periphery of a power source forming portion in the power window driving control device illustrated in FIG. 9.

A peripheral circuit of the power source B, which serves as a low voltage power source in the present embodiment, can be structured by adding diodes as illustrated in FIG. 10. Namely, the cathodes of diodes 34, 36, 317, 318 are connected together. The anode of the diode 317 is connected between the switch 50 and the resistor 54. The anode of the diode 318 is connected between the switch 52 and the resistor 56. In this way, when either of the switches 50, 52 is on, the power source B serving as a low voltage power source can be formed.

Accordingly, when either of the relay circuits 14, 16 is energized, and energized circuit structure can be formed.

When the relays 14, 16 are not energized, a circuit structure without dark current can be formed.

In the present embodiment, an example is described in which the coils 22, 24 are energized or become non-energized in accordance with the logic of a logic circuit portion 200 in accordance with the on/off state of the switches. However, the present invention is not limited to the same. A structure in which the coils are energized/ become non-energized directly by the manual switches being turned on/off is easily applicable to the present invention.

Further, in the present embodiment, an example is described in which the front passenger's side window glass is moved vertically. However, the present invention is not limited to the same and may be applied to any of the window glasses of a vehicle. For example, the present invention may be applied to the window glasses of the rear passengers' seats. Moreover, the moving direction of the window glass is not limited, and the present invention can be easily applied to, for example, a case in which a window glass is moved horizontally, such as a sunroof disposed at the top portion of a vehicle, or the like. The present invention is also applicable to cases which a window glass is moved in an inclined or a transverse direction.

A fifth embodiment of the present invention will now be described in detail with reference to the drawings. In the fifth embodiment, the present invention is applied to a power window driving control apparatus in which a window glass is raised or lowered by the designation of either a master switch at the driver's seat or switches which are disposed to correspond to the various seats (e.g., front passenger's seat, rear passenger's seat).

Figure 11:
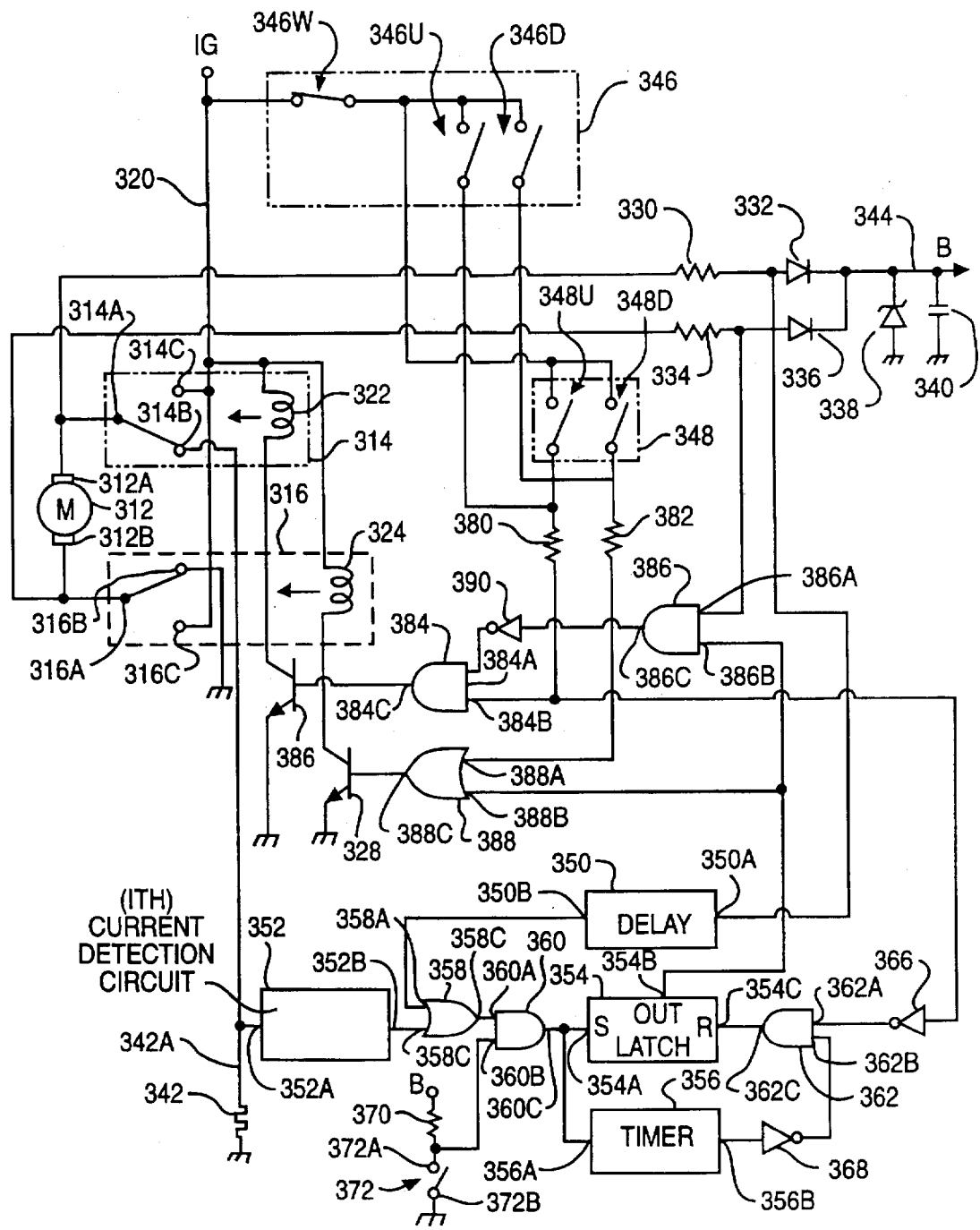
FIG. 11 is a block diagram illustrating a schematic structure of a power window driving control device relating to a fifth embodiment of the present invention.

In FIG. 11, a schematic structure of a power window driving control apparatus 310 relating to the present embodiment is illustrated as a block diagram.

Both terminals 312A, 312B of a motor 312 for driving a power window are connected to common terminals 314A, 316A, respectively, of first and second relay circuits 314, 316. The first relay circuit 314 is used to raise the window glass. A first contact 314B of the first relay circuit 314 is grounded via a minute resistor 342 (approximately 10mΩ).

Further, a second contact 314C is connected to a power source wire 320. The first relay circuit 314 has a first coil 322. When the first coil 322 is energized, the second contact 314C switches. The power source wire 320 is connected via an unillustrated ignition switch to a terminal IG connected to a battery BT which is installed in the vehicle. When the unillustrated ignition switch is turned on, power is supplied to the power source wire 320.

The second relay circuit 316 is used for lowering the window glass. A first contact 316B of the second relay circuit 316 is grounded. The second relay circuit 316 has a second coil 324. When the second coil 324 is non-energized, the first contact 316B switches. When the second coil 324 is energized, a second contact 316C switches.

Respective ones of terminals of the first and second coils 322, 324 are connected to the power source wire 320. The respective other terminals are connected to collectors of NPN type first and second transistors 326, 328. The emitters of the first and second transistors 326, 328 are grounded. Accordingly, the first coil 322 is energized by the transistor 326 being turned on, and the second contact 314C of the first relay circuit 314 switches. The motor 312 is driven forward, and the window glass can be raised. Further, the second coil 324 is energized by the transistor 328 being turned on, and the second contact 316C of the second relay circuit 316 switches. The motor 312 is rotated in reverse, and the window glass can be lowered.

The common terminal 314A of the first relay circuit 314 (the terminal 312A of the motor 312) is connected to a power source wire 344 via a resistor 330 and a diode 332. The common terminal 316A of the second relay circuit 316 (the terminal 312B of the motor 312) is connected to the power source wire 344 via a resistor 334 and a diode 336. The cathode of a Zener diode 338 is connected to the power source wire 344, and the anode thereof is grounded. Accordingly, when electric power for driving the motor 312 is supplied to either of the terminals 312A, 312B, power is supplied to the power source wire 344 via the resistor 330 and the diode 332, or via the resistor 334 and the diode 336. A power source B, serving as a low voltage power source, is formed at the power source wire 344 by the Zener diode 338 and a capacitor 340.

A window glass raising/lowering designation switch 346 at the driver's side is connected to the power source wire 320. The occupant in the driver's seat uses the window glass raising/lowering designation switch 346 at the driver's side to raise and lower the front passenger's side window glass. The window glass raising/lowering designation switch 346 at the driver's side is formed from a window glass raising designation switch 346U, a window glass lowering designation switch 346D, and a window lock switch 346W. The window lock switch 346W is structured such that even if the raising/lowering of the window glass is designated, electric power is not supplied from the battery BT so that the motor does not rotate. Namely, when the window lock switch 346W is turned on, the window lock switch 346W is in an interrupted state (the contacts of both terminals are open).

The window lock switch 346W is connected to both driver's side and front passenger's side switches formed from window glass raising designation switches 346U, 348U and window glass lowering designation switches 346D, 348D, respectively. When the window lock switch 346W is in a connected state, the driver's side switch 346 and the front passenger's side switch 348 are respectively connected to the terminal IG.

Further, the driver's side window glass raising designation switch 346U and window glass lowering designation switch 346D are connected in parallel to the front passenger's side window glass raising designation switch 348U and window glass lowering designation switch 348D.

Accordingly, a designation for raising or lowering the front passenger's side window glass can come from both the driver's side and the front passenger's side.

The connection of the driver's side window glass raising designation switch 346U and the front passenger's side window glass raising designation switch 348U is connected to a second input terminal 384B of an AND circuit 384 via a resistor 380. A first input terminal 384A of the AND circuit 384 is connected to an output terminal 386C of an AND circuit 386 via an inverter 390. A first input terminal 386A of the AND circuit 386 is connected between the resistor 334 and the diode 336. A second input terminal 386B is connected to a second input terminal 388B of an OR circuit 388 and is connected to an output terminal 354B of a latch circuit 354 which will be described later. Further, an output terminal 384C of the AND circuit 384 is connected to the base of the transistor 326.

The connection of the window glass lowering designation switch 346D and the window glass lowering designation switch 348D is connected to a first input terminal 388A of the OR circuit 388. An output terminal 388C of the OR circuit 388 is connected to the base of the transistor 328.

An input terminal 352A of a motor overload current detection circuit 352 is connected to a terminal 342A of the minute resistor 342. The current flowing to the motor 312 is input to the motor overload current detection circuit 352. The motor overload current detection circuit 352 is formed by a comparator, a current-voltage conversion circuit, and the like. When the inputted current exceeds a predetermined current Ith, the motor overload current detection circuit 352 outputs a high level signal. An output terminal 352B of the motor overload current detection circuit 352 is connected to a second input terminal 358B of an OR circuit 358.

A first input terminal 358A of the OR circuit 358 is connected to an output terminal 350B of a timer circuit 350. An input terminal 350A of the timer circuit 350 is connected between the resistor 330 and the diode 332. The timer circuit 350 is structured so as to include a delay circuit. The timer circuit 350 delays by a predetermined time (in the present embodiment, about 10 seconds) from the rise of the inputted signal. This predetermined time is sufficient for the window glass to automatically move up or down. The timer circuit 350 outputs a high level signal. When the input signal falls, the output signal of the timer circuit 350 becomes a low level signal. Accordingly, if one of the raising switches 346U, 348U is on, the timer circuit 350 outputs a high level signal to the OR circuit 358 after the predetermined time (about 10 seconds) has passed from the time power is supplied to the terminal 312A of the motor 312.

An output terminal 358C of the OR circuit 358 is connected to a first input terminal 360A of an AND circuit 360. The OR circuit 358 outputs the logical sum of the output signals of the timer circuit 350 and the motor overload current detection circuit 352 to the AND circuit 360. A second input terminal 360B of the AND circuit 360 is connected either to a complete-close sensor switch 372, which is disposed in a vicinity of the upper edge of the window frame of the vehicle, or to a terminal 372A of a complete-close sensor which has the same function. The terminal 372A is connected to the power source B via a resistor 370, and a terminal 372B is grounded. When the window glass is completely closed, the complete-close sensor switch 372 is on and the terminals 372A, 372B are connected. When the window glass is completely closed and the second input terminal 360B of the AND circuit 360 is grounded via the complete-close sensor switch 872, the electric potential level of the second input terminal 360B becomes a low level. At times other than when the window glass is completely closed, power is supplied by the power source B via the resistor 370, and the electric potential is at a high level.

An output terminal 360C of the AND circuit 360 is connected to an input terminal 354A of the latch circuit 354. The AND circuit 360 outputs to the latch circuit 354 the logical product of the output signal of the OR circuit 358 and the signal in accordance with the on/off state of the complete-close sensor switch 372. The latch circuit 354 is formed by a flip-flop circuit or the like, and maintains the output signal at a high level at the rise of the input signal. Accordingly, when the output signal of the latch circuit 354 becomes a high level signal, due to the AND circuit 386 outputting a high level signal, the AND circuit 384 outputs a low level signal and the transistor 26 is turned off. Further, the high level output signal of the latch circuit 354 passes through the OR circuit 388 and turns on the transistor 332. The coil 322 becomes non-energized, the coil 324 is energized, and the window glass is lowered.

An input terminal 356A of a timer circuit 356 is connected between the output terminal 360C of the AND circuit 360 and the input terminal 354A of the latch circuit 354. The timer circuit 356 outputs a high level signal synchronously with the rise of the inputted signal. The timer circuit 356 delays by a predetermined time t1 from the fall of the inputted signal, and outputs a low level signal. An output terminal 356B of the timer circuit 356 is connected to a second input terminal 362B of an AND circuit 362 via an inverter 368. A first input terminal 362A of the AND circuit 362 is connected to the second input terminal 384B of the AND circuit 384 via an inverter 366. An output terminal 362C of the AND circuit 362 is connected to a reset terminal 354C of the latch circuit 354. Accordingly, when the output signal of the AND circuit 362 becomes a high level, the latch circuit 354 is reset. The output signal of the latch circuit 354 becomes a low level signal, and the transistor 328 is turned off.

Figure 12:
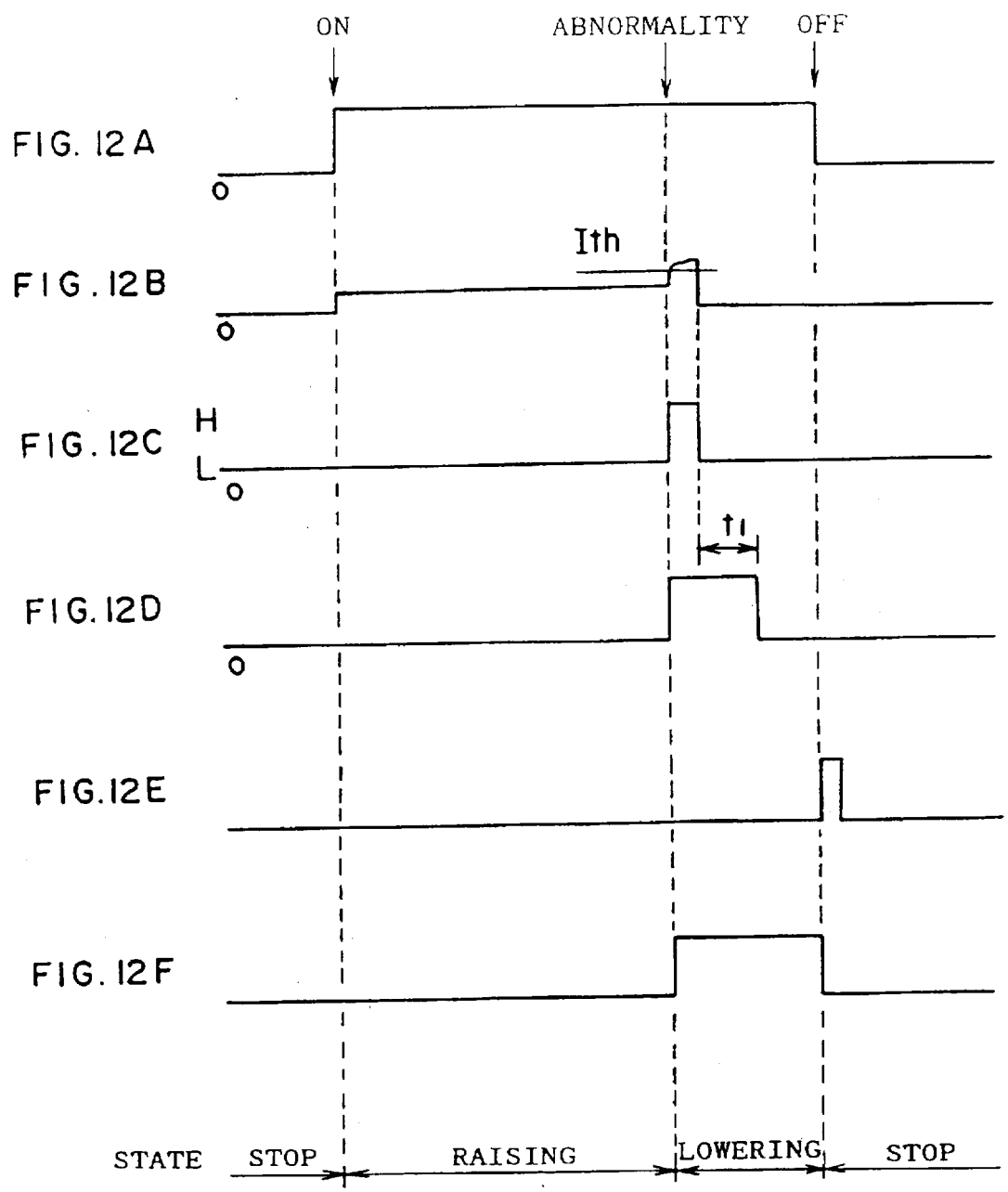
FIGS. 12A through 12F are time charts of the power window driving control device when overload current is flowing to a motor when a window glass is being raised.
Figure 13:
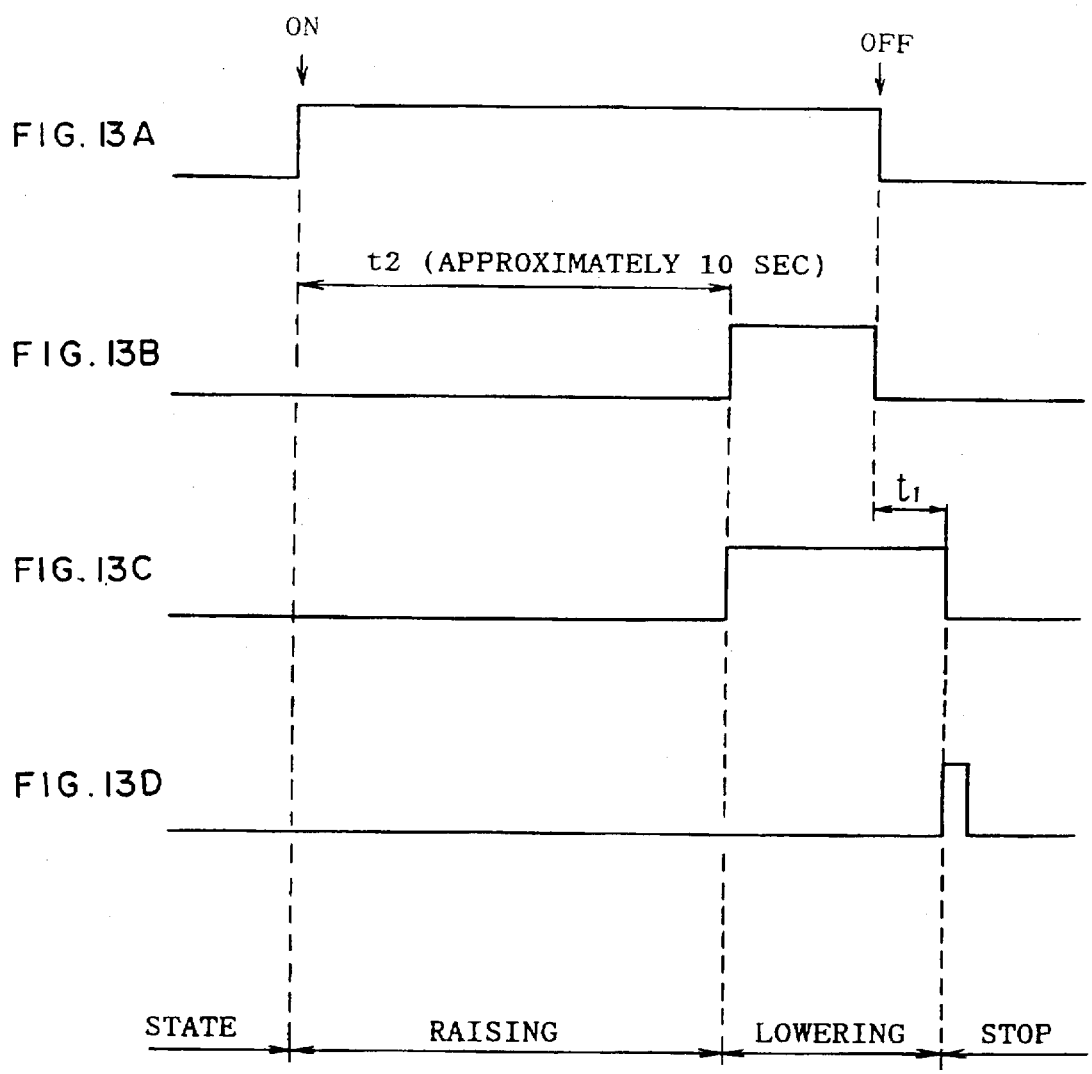
FIGS. 13A through 13D are time charts of the power window driving control device when the window glass is raised continuously for a predetermined time.

Hereinafter, operation of the present embodiment will be described with reference to the time charts in FIGS. 12 and 13. First, in order to raise the front passenger's side window glass, either the driver's side raising switch 346U or the front passenger's side raising switch 348U is turned on. Accordingly, as illustrated in FIG. 12A, a high level signal is input to the second input terminal 384B of the AND circuit 384 via the resistor 380.

When raising of the window glass is designated, both of the first and second relay circuits 322, 324 become non-energized. Therefore, both terminals of the motor 312 are grounded via the minute resistor 342. Accordingly, because the signal between the resistor 334 and the diode 336 is a low level signal, the output signal of the AND circuit 386 is a low level. The low level signal outputted from the AND circuit 386 is inverted by the inverter 390, and a high level signal is input to the first input terminal 384A of the AND circuit 384.

The output signal of the AND circuit 384 is a high level signal. The transistor 326 is turned on by this high level signal. Due to the transistor 326 being turned on, the coil 322 of the relay circuit 314 is energized, and the second contact 314C switches. The motor 312 is driven forward, and the window glass is raised.

While the window glass is being raised, the current flowing in the motor 312 is detected at the motor overload current detection circuit 352. In this case, as illustrated in FIG. 12B, a predetermined current flows in the motor 312 under normal conditions, i.e., when the window glass is raised with a load such as sliding resistance, which is due only to the structure of the window glass, being applied to the motor 312.

If the window glass continues to rise when an obstacle such as a foreign object or the like exists on the path of the rising window as it is being closed, the rising of the window glass is impeded before the window glass is completely closed, and the foreign object may become caught between the window glass and the window frame. Due to the foreign object becoming caught between the window glass and the window frame, the motor 312 is overloaded, and abnormal current is generated (see FIG. 12B). When the detected current exceeds a predetermined current value Ith, the motor overload current detection circuit 352 outputs a high level signal (FIG. 12C). At this time, because the complete-close sensor switch 372 is off, the AND circuit 360 outputs the signal illustrated in FIG. 12C. At the rise of this signal, the latch circuit 354 is latched. The latch circuit 354 outputs a high level signal. The AND circuit 386 thereby outputs a high level signal, and the AND circuit 384 outputs a low level signal. The transistor 326 is thereby turned off, and the coil 322 becomes non-energized. The relay circuit 314 returns to the contact 314B. At this time, a high level signal is input to the base of the transistor 328 through the OR circuit 388. The coil 324 is thereby energized, and the contact 316C of the relay circuit 316 switches. Accordingly, the motor 312 is rotated reversely, and the lowering of the window glass begins.

Due to the motor 312 rotating in reverse, the overloaded state of the motor 312 is canceled, and the output signal of the AND circuit 360 falls. The timer circuit 356 delays by a predetermined time t1 from the fall of the output signal of the AND circuit 360, and outputs a low level signal. At this time, if either of the raising switches 346U, 348U continues to be held in an on state, the signal inputted to the AND circuit 362 via the inverter 366 is a low level signal (FIG. 12E). Therefore, the AND circuit 362 outputs a low level signal, and the latch circuit 354 is not reset. Accordingly, the output signal of the latch circuit 354 is maintained at a high level, and the motor 312 continues to be driven in reverse. If either of the raising switches 346U, 348U which is on is turned off and the designation for raising the window glass is canceled, the signals inputted to the AND circuit 362 respectively become high level signals, and the latch circuit 354 is reset (FIG. 12F). The transistor 328 is turned off, and the relay 324 becomes non-energized. Accordingly, the motor 312 is stopped, and the lowering of the window glass is stopped.

When a foreign object is caught between the window glass and the window frame, and, for example, an occupant notices and turns the raising switch off, the signal inputted to the AND circuit 362 via the inverter 366 becomes a high level signal. The input signal from the timer circuit 356 is delayed by a predetermined time t1 and becomes a low level signal. Therefore, the energized state of the relay circuit 316 continues for a predetermined timer, and the motor 312 is rotated in reverse. Accordingly, the window glass is lowered for a predetermined time and stops.

Accordingly, if a foreign object exists on the path along which the window glass is being raised and becomes caught between the window glass and the window frame, the motor is rotated in reverse.

If either of the raising switches 346U, 348U is turned on, the timer circuit 350 outputs a high level signal after a predetermined time t2 (approximately 10 seconds) as illustrated in FIG. 13B. Accordingly, when the window glass is not completely closed after the raising switch is turned on and 10 seconds have passed, the AND circuit 360 outputs a high level signal, and the latch circuit 354 outputs a high level signal. The coil 324 of the relay circuit 316 is thereby energized. The motor 312 is rotated reversely, and the lowering of the window glass begins.

When the AND circuit 360 outputs a high level signal, the timer circuit 356 outputs a high level signal. Accordingly, the signal inputted to the AND circuit 362 via the inverter 368 is a low level signal. Therefore, the on state of the transistor 328 continues and the reverse rotation of the motor 312 continues without the latch circuit 354 being reset.

At this time, if the raising switch is turned off (FIG. 13A), the signal inputted to the AND circuit 362 via the inverter 366 becomes a high level signal, and the timer circuit 350 is reset (FIG. 13B). Due to the resetting of the timer circuit 350, the AND circuit 360 outputs a low level signal. The output signal of the timer circuit 356 becomes a low level signal (FIG. 13C) after a predetermined time t1 passes from the fall of the signal outputted by the AND circuit 360. Accordingly, the signal outputted by the AND circuit 362 becomes a high level signal (FIG. 13D) after a predetermined time t1 passes after the raising switch is turned off. At the rise when the signal outputted by the AND circuit 362 becomes a high level signal, the latch circuit 354 is reset. The transistor 326 is turned off, and the coil 324 of the relay circuit 316 becomes non-energized. The motor 312 is thereby stopped, and the raising or lowering of the window glass stops.

Accordingly, as in a case in which there is a soft foreign object on the path along which the window glass is raised or when the window glass is urged by a foreign object, even if the raising of the window glass has not been completed within the predetermined time (about 10 seconds), the motor 312 is rotated in reverse due to the output signal, which is delayed by a predetermined time, of the timer circuit 350. Further, even in a case in which an overload current of the motor 312 cannot be detected at the motor overload current detection circuit 352, or in a case in which the motor overload current detection circuit 352 is damaged, the existence of a foreign object on the path of the rising window glass can be detected by monitoring the rising time of the window glass, and the motor can be rotated in reverse.

Further, in the present embodiment, the state of the switch for designating the raising/lowering of the window glass is determined by the structure of the logic circuit. In accordance with this determination, the motor is driven forward or is driven in reverse. Therefore, there is no need for a structure in which a signal wire and a power wire are combined as in an apparatus which directly supplies and cuts off power to a motor by a switch. Accordingly, it suffices to use fewer power source wires, and the wiring of the apparatus can be made more reliable.

Next, equivalent circuits of a logic circuit used to drive the relays 314, 316 in FIG. 11, which is a block diagram of a schematic structure of the power window driving control device 310, will be described.

Figure 14:
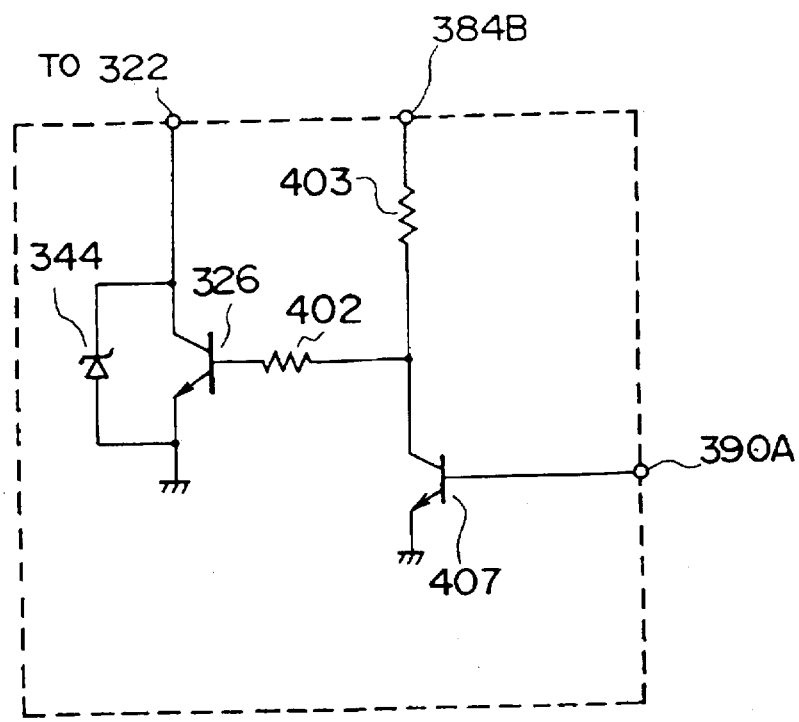
FIG. 14 is a circuit diagram of a first example of an equivalent circuit of a relay circuit peripheral logic circuit for raising the window glass in the power window driving control device illustrated in FIG. 11.

FIG. 14 illustrates a logic circuit portion for operating the first relay 314 for raising the window glass. Namely, FIG. 14 shows an equivalent circuit of a circuit formed by the transistor 326, the AND circuit 384, and the inverter 390.

The input terminal equivalent to the second input terminal 384B of the AND circuit 384 is connected to the collector of a transistor 407 via a resistor 403. The collector of the transistor 407 is connected to the base of the transistor 326, which was described previously, via a resistor 402. The emitter of the transistor 407 is grounded. The base of the transistor 407 is formed as a terminal which is equivalent to the input terminal of the inverter 390.

Figure 15:
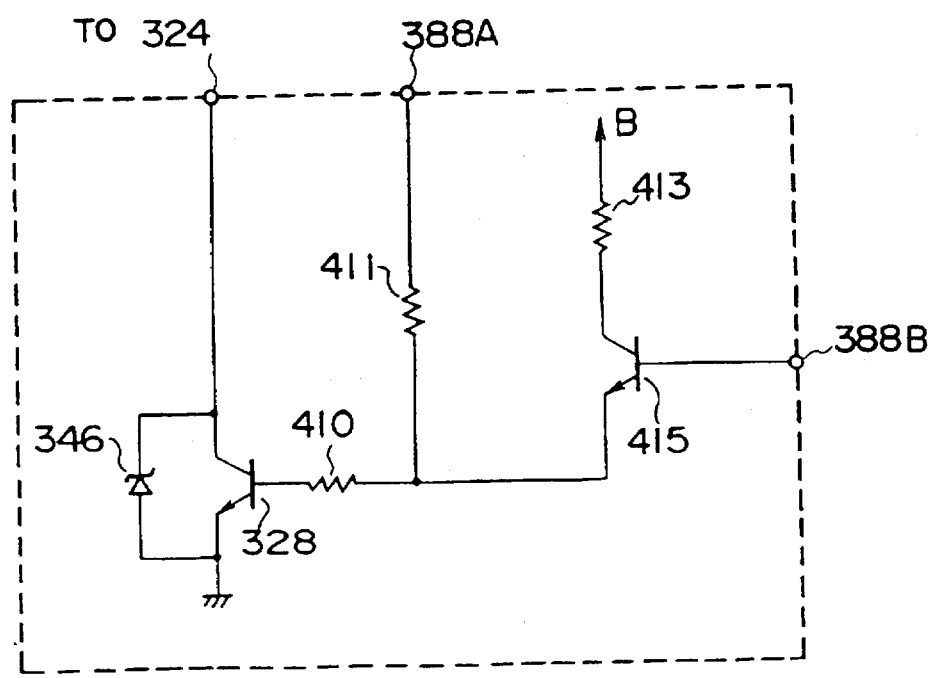
FIG. 15 is a circuit diagram of a first example of an equivalent circuit of a relay circuit peripheral logic circuit for lowering the window glass in the power window driving control device illustrated in FIG. 11.

FIG. 15 illustrates a logic circuit portion for operating the second relay 316 for lowering the window glass. Namely, FIG. 15 shows an equivalent circuit of a circuit formed by the transistor 328 and the OR circuit 362.

The input terminal equivalent to the first input terminal 388A of the OR circuit 388 is connected to the emitter of a transistor 415 via a resistor 411. The input terminal equivalent to the second input terminal 388B is connected to the base of the transistor 415. The collector of the transistor 415 is connected via a resistor 413 to the power source B which serves as a low voltage power source. The emitter of the transistor 415 is connected via a resistor 410 to the base of the transistor 328 which was described previously.

Figure 16:
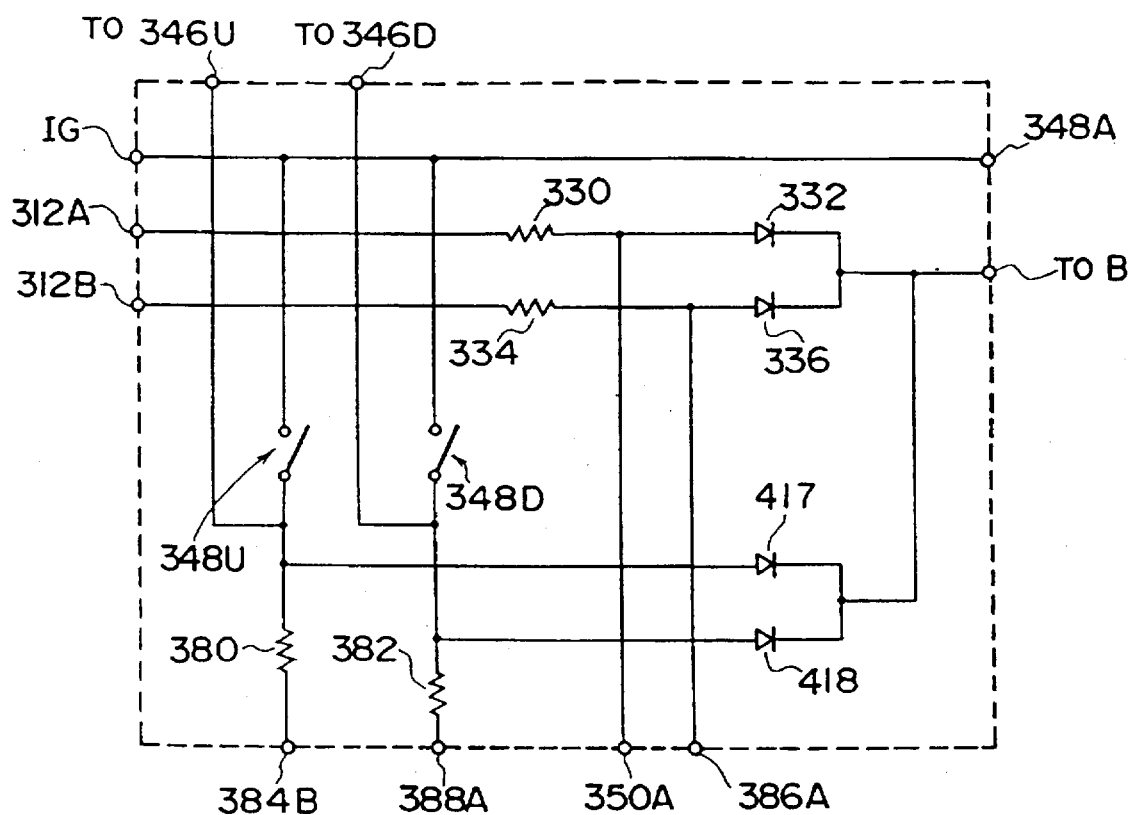
FIG. 16 is a circuit diagram illustrating another example of a periphery of a power source forming portion in the power window driving control device illustrated in FIG. 11.

A peripheral circuit of the power source B, which serves as a low voltage power source in the present embodiment, can be structured by adding diodes as illustrated in FIG. 16. Namely, the cathodes of diodes 332, 336, 417, 418 are connected together. The anode of the diode 417 is connected between the switch 348U and the resistor 380. The anode of the diode 418 is connected between the switch 348D and the resistor 382. In this way, when either of the switches 348U, 348D is on, the power source B serving as a low voltage power source can be formed.

Accordingly, when wither of the relay circuits 14, 16 is energized, an energized circuit structure can be formed. When the relay circuits 314, 316 are not energized, a circuit structure without dark current can be formed.

Further, the present embodiment describes an example including switches for raising and lowering the window glasses on the driver's side and the front passenger's side. However, the present invention is not limited to the same and may be applied to switches for raising and lowering a window glass disposed anywhere in a vehicle. In this case, the switch for manually raising/lowering the front passenger's side window glass, which is described in the present embodiment, may be replaced by a switch for raising/lowering a rear window glass disposed at the rear passenger's seat. By providing the same structure as that described in the present embodiment, the present invention is applicable to all of the switches for raising/lowering the window glasses of the vehicle.

Further, in the present embodiment, an example is described in which the window glass is moved vertically. However, the present invention is not limited to the same. The present invention can be easily applied to, for example, a case in which a window glass is moved horizontally, such as a sunroof disposed at the top portion of a vehicle, or the like. Moreover, the present invention is also applicable to cases in which a window glass is moved in an inclined or a transverse direction.

A sixth embodiment of the present invention will now be described in detail with reference to the drawings. In the fifth embodiment, parts which are the same as those of the fourth embodiment are denoted with the same reference numerals, and description thereof is omitted. In the fifth embodiment, the present invention is applied to a power window driving control apparatus in which a window glass is raised or lowered by the designation of either a master switch at the driver's seat or switches which are disposed so as to correspond to the various seats (e.g., front passenger's seat, rear passenger's seat).

Figure 17:
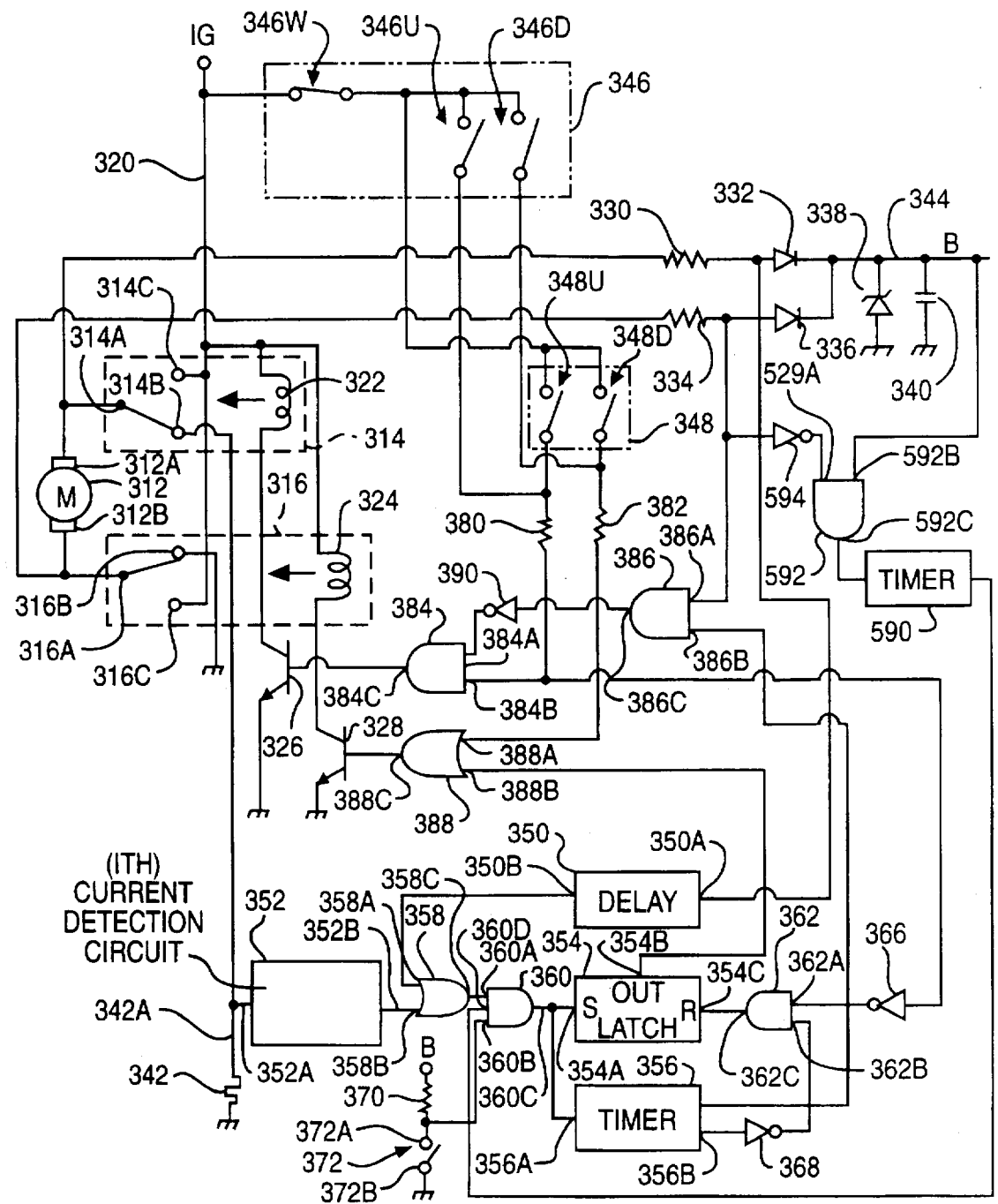
FIG. 17 is a block diagram illustrating a schematic structure of a power window driving control device (manual operation) relating to a sixth embodiment.

In FIG. 17, a schematic structure of a power window driving control apparatus 510 relating to the present embodiment is illustrated as a block diagram. The first input terminal 386A of the AND circuit 386 is connected between the resistor 334 and the diode 336. The second input terminal 386B is connected to the output terminal of the timer 356 which will be described later.

The output terminal 384C of the AND circuit 384 is connected to the base of the transistor 326.

The connection of the window glass lowering designation switch 346D and the window glass lowering designation switch 348D is connected via the resistor 382 to the first input terminal 388A of the OR circuit 388. The signal wire from the output terminal 354B of the latch circuit 354 is connected to the second input terminal 388B of the OR circuit 388. The output terminal 388C of the OR circuit 388 is connected to the base of the transistor 328.

The third input terminal 360D of the AND circuit 360 is connected to the output terminal of a timer circuit 590. The input terminal of the timer circuit 590 is connected to an output terminal 592C of an AND circuit 592. When the signal from the output terminal 592C of the AND circuit 592 changes from a high level to a low level, the timer circuit

590 delays by a predetermined time (approximately 50 msec) and outputs a high level signal. Further, when the signal from the output terminal 592C of the AND circuit 592 changes from a low level to a high level, the timer circuit 590 switches to a low level signal.

A first input terminal 592A of the AND circuit 592 is connected between the resistor 334 and the diode 336 via an inverter 594. A second input terminal 592B is connected to the power source wire 344.

The output terminal 360C of the AND circuit 360 is connected to the input terminal 354A of the latch circuit 354. The AND circuit 360 outputs to the latch circuit 354 the logical product of the output signal of the OR circuit 358, a signal corresponding to the on/off state of the complete-close sensor switch 372, and the output signal from the timer circuit 590. The latch circuit 354 is formed by a flip-flop circuit or the like, and maintains the output signal at a high level at the rise of the input signal. Accordingly, the high level output signal of the latch circuit 354 passes through the OR circuit 388 and turns the transistor 328 on.

The input terminal 356A of the timer circuit 356 is connected between the output terminal 360C of the AND circuit 360 and the input terminal 354A of the latch circuit 354. The timer circuit 356 outputs a high level signal synchronously with the rise of an input signal. The timer circuit 356 delays a predetermined time t1 (e.g., 0.2 seconds) from the fall of the input signal, and outputs a low level signal. The output terminal 356B of the timer circuit 356 is connected to the second input terminal 362B of the AND circuit 362 via the inverter 368. The first input terminal 362A of the AND circuit 362 is connected via the inverter 366 to respective ones of terminals on the non-power source wire sides of the rising switches 346U, 348U. The output terminal 362C of the AND circuit 362 is connected to the reset terminal 354C of the latch circuit 354. Accordingly, when the output signal of the AND circuit 362 becomes a high level signal, the latch circuit 354 is reset. The output signal of the latch circuit 354 becomes a low level signal, and the transistor 328 is turned off.

Operation of the present embodiment will now be described with reference to the time charts in FIGS. 18 and 19.

(Explanation of Operations for Avoiding Foreign Objects Becoming Caught or the Like)

Figure 18:
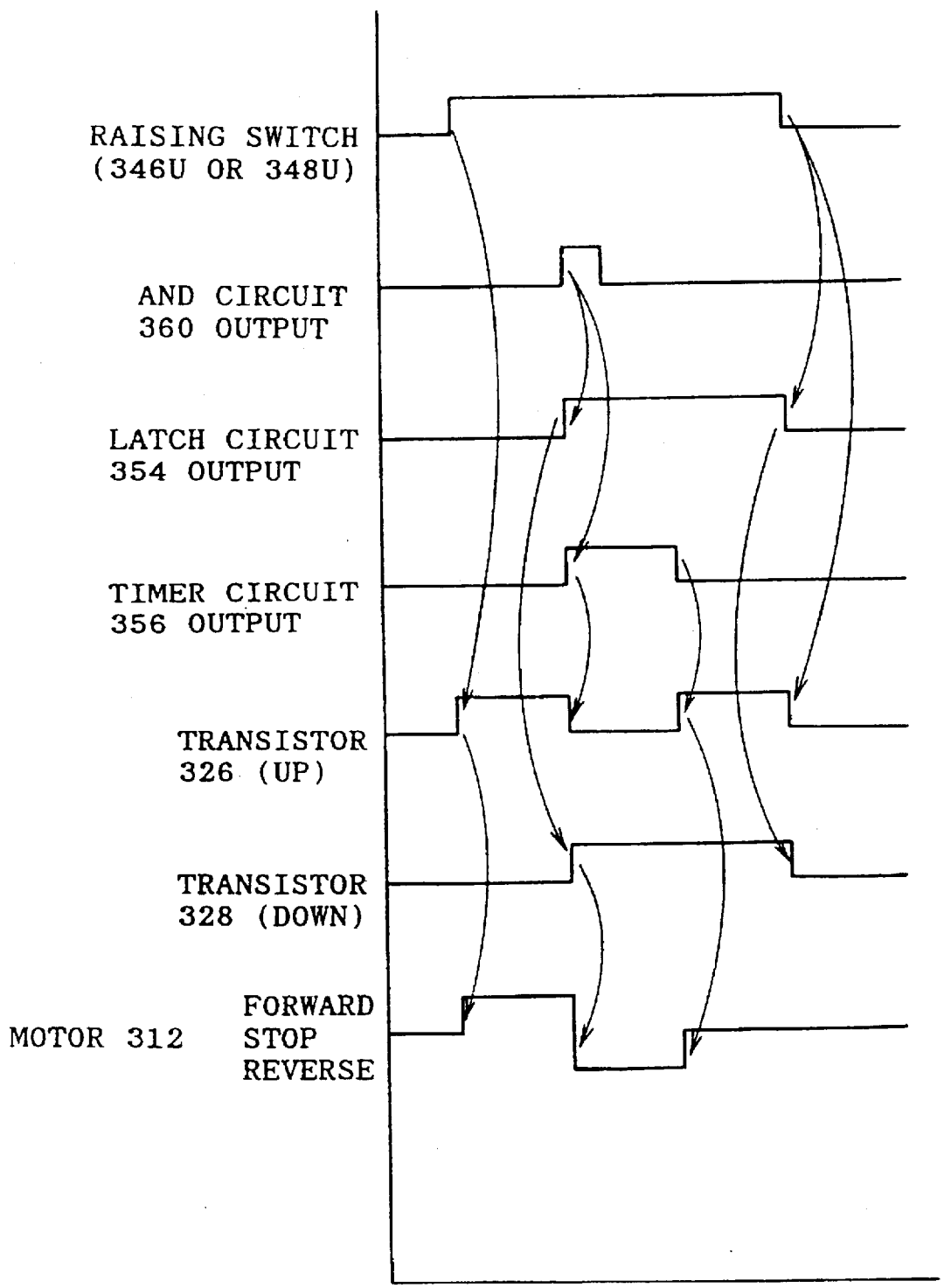

As illustrated in FIG. 18, in order to raise the front passenger's side window glass, first, either the raising switch 346U on the driver's side or the raising switch 348U on the front passenger's side is turned on. Accordingly, a high level signal is input to the second input terminal 384B of the AND circuit 384 via the resistor 380.

Because both of the first and second relay circuits 322, 324 are not energized when the raising of the window glass is designated, one terminal of the motor 312 is grounded via the minute resistor 342. Accordingly, because the signal between the resistor 334 and the diode 336 is a low level signal, the output signal of the AND circuit 386 is at a low level. The low level signal outputted from the AND circuit 386 is inverted by the inverter 390, and a high level signal is input to the first input terminal 384A of the AND circuit 384. The output signal of the AND circuit 384 becomes a high level signal. The transistor 326 is turned on by this high level signal. Due to the transistor 326 being turned on, the coil 322 of the relay circuit 314 is energized, and the second contact 314C switches. The motor 312 is driven forward, and the window glass is raised.

While the window glass is being raised, the current flowing in the motor 312 is detected at the motor overload current detection circuit 352. In this case, a predetermined current flows in the motor 312 under normal conditions, i.e., when the window glass is raised with a load such as sliding resistance, which is due only to the structure of the window glass, being applied to the motor 312.

If the window glass continues to rise when an obstacle such as a foreign object or the like is placed along the path of the rising window as it is being closed, the rising of the window glass is impeded before the window glass is completely closed, and the foreign object may become caught between the window glass and the window frame. Due to the foreign object becoming caught between the glass and the frame, the motor 312 is overloaded, and abnormal current is generated. When the detected current exceeds a predetermined current value Ith, the motor overload current detection circuit 352 outputs a high level signal. At this time, because the complete-close sensor switch 372 is off, the AND circuit 360 switches to a low level. The latch circuit 354 is latched at the fall of this signal, and outputs a high level signal.

Subsequently, due to The high level signal from the latch circuit 354, a high level signal is input to the base of the transistor 328 through the OR circuit 388. The coil 324 is thereby energized, and the contact 316C of the relay circuit 316 switches. At this time, the input terminal 386A of the AND circuit 386 becomes a high level.

Due to the (high level) output of the timer 356, the input terminal 386B of the AND circuit 386 also becomes a high level. The AND circuit 386 outputs a high level signal. The high level signal is inverted by the inverter 390, and the AND circuit 384 outputs a low level signal. The transistor 326 is thereby turned off, and the coil 322 becomes non-energized. The relay circuit 314 returns to the contact 314B. Accordingly, the motor 312 is rotated in reverse, and the lowering of the window glass begins.

Due to the motor 312 being rotated in reverse, the overloaded state of the motor 312 is canceled, and the output signal of the AND circuit 360 falls. The timer circuit 356 delays by a predetermined time t1 from the time when the output signal of the AND circuit 360 falls. As a result, regardless of whether either of the raising switches 346U, 348U is on or off, the input terminal 386B of the AND circuit 386 becomes a low level after a fixed time. The output terminal 386C of the AND circuit 386 is at a low level, and the output of the inverter 390 is at a high level. The output of the AND circuit 384 becomes a high level, and the second contact 314C switches. As a result, the motor 312 continues to, rotate in reverse during the time in which the timer circuit 356 is at a high level, and stops after t1 seconds.

While the raising switches 346U, 348U are on, the second contacts 314C, 316C of the relay circuits 314, 316 switch. As a result, after the reversal operation has stopped, the window glass does not immediately begin to rise again. Therefore, unstable operations such as repeated detection of an object being caught, repeated reversal of the window glass, and repeated raising of the window glass can be prevented.

When either of the raising switches 346U, 348U, which is on, is turned off and the designation for raising the window glass is canceled, the signals inputted to the AND circuit 362 respectively become high level signals. The latch circuit 354 is reset, and the transistor 328 is turned off. The relay 324 becomes non-energized.

Even if a foreign object becomes caught between the window glass and the window frame and, for example, an occupant notices and turns the raising switch off, the signal inputted to the AND circuit 362 via the inverter 366 becomes a high level signal. Because the input signal from the timer circuit 356 is delayed by a predetermined time t1 and is a low level signal, the energized state of the relay circuit 316 is maintained for a predetermined time, and the motor 312 is rotated in reverse. Accordingly, the window glass is lowered for a predetermined time and stops.

In this way, when there exists a foreign object on the path of movement of the rising window glass and the foreign object becomes caught between the window glass and the window frame, the motor is rotated in reverse for a predetermined time.

Further, when either of the raising switches 346U, 348U are turned on, the timer circuit 350 outputs a high level signal after a predetermined time t2 (approximately 10 seconds). Accordingly, when the window glass is not completely closed after 10 seconds have passed from the time the raising switch is turned on, the AND circuit 360 outputs a high level signal, and the latch circuit 354 outputs a high level signal. The coil 324 of the relay circuit 316 is thereby energized, and the motor is rotated reversely. The lowering of the window glass begins, and, in the same way as described previously, the motor 312 stops after a predetermined time passes.

Accordingly, even when the raising of the window glass is not completed within a predetermined time (approximately 10 seconds), such when a soft foreign object exists on the rising path of the window glass or when a foreign object adheres to the window glass, the motor 312 is rotated reversely by the output signal, which is delayed by a predetermined time, of the timer circuit 350. Further, even in a case in which an overload current of the motor 312 cannot be detected at the motor overload current detection circuit 352 or in a case in which the motor overload current detection circuit 352 is damaged, the existence of a foreign object on the rising path of the window glass can be detected by monitoring the rising time of the window glass, and the motor can be rotated in reverse.

(Operations for Avoiding Incorrect Detection of Rush Current when Switches are Operated)

When the raising switches 346U, 348U and the lowering switches 346D, 348D are operated, rush current is generated. Because the rush current exceeds the current level detected when a foreign object is caught, an incorrect determination may be made that there is abnormal current, and the above-described operations for avoiding a foreign object becoming caught may be effected. Therefore, in the present embodiment, a blanking period is provided for a predetermined time after the beginning of the operation of the switch.

Figure 19:
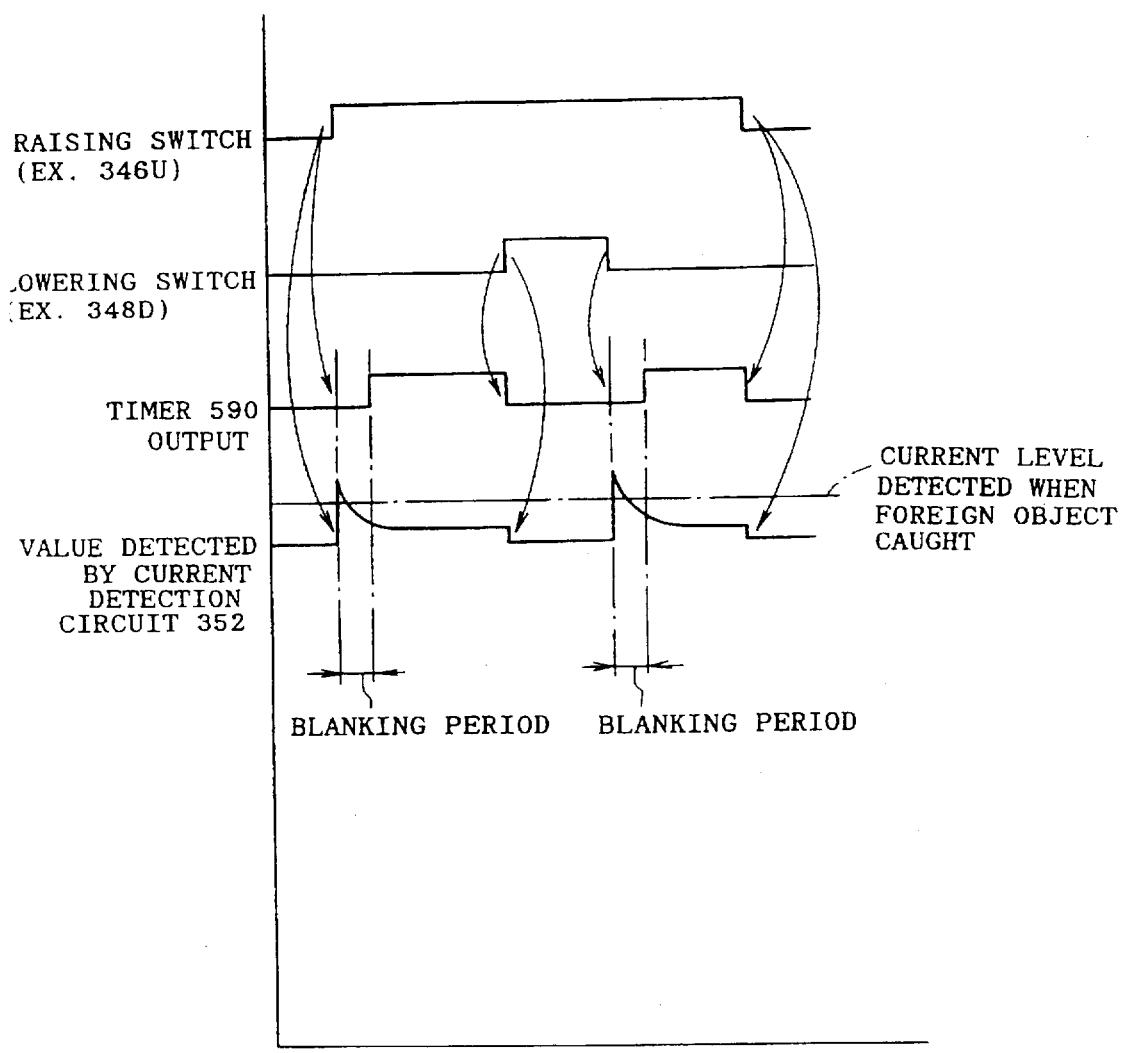
FIG. 19 is a time chart explaining operations for avoiding incorrect detection of rush current when a switch is operated.

Namely, as shown in FIG. 19, an output signal of the timer circuit 590 is inputted to the third input terminal 360D of the AND circuit 360. When the signal from the power source wire 344 and the signal from the inverter 594 are input and the first contact 316B of the second relay circuit 316 switches, the output of the AND circuit 592 is a high level, and the output signal of the timer circuit 590 remains at a low level.

When the raising switches 346U, 348U are operated and the second contact 314C of the first relay circuit 314 switches, current flows to both terminals of the motor 312. Therefore, the output of the AND circuit 592 becomes a low level. Due to this switching from a high level to a low level, operation of the timer circuit 590 begins, and after a predetermined time (50 msec) passes, a high level signal is output. Due to the output of this high level signal, the output at the AND circuit 360 changes only in accordance with the signal from the OR circuit 358.

After the raising switches 346U, 348U are operated, a high level signal is output to the AND circuit 360 after a predetermined time (blanking period) has passed. During this predetermined time, even if rush current, which is equivalent to that when a foreign object is caught, is detected and a high level signal is output from the OR circuit 358, the output of the AND circuit 360 is maintained at a low level during the predetermined time. As a result, errors in detection can be prevented.

Further, rush current may be generated at times other than immediately after operation of the raising switches 346U, 348U begins. For example, if the lowering switch 348D is operated while the raising switch 346U is being operated, the driving of the motor 312 stops. However, at the circuit, the time of the starting of the operation of the raising switches 346U, 348U has passed. Therefore, the above-described blanking period has already elapsed.

However, at the AND circuit 592, the second contacts 314C, 316C of the first and second relay circuits 314, 316 switch at the time when the lowering switch 348D is operated. Therefore, the output of the AND circuit 592 becomes a high level, and the output of the timer circuit 590 becomes a low level. Thereafter, when the operation of the lowering switch 348D is completed, the output of the AND circuit 592 switches from a high level to a low level. This is the same as the beginning of the blanking period immediately after operation of the switch as described above. Therefore, the timer circuit 590 outputs a high level signal after a predetermined time (50 msec) has elapsed.

Accordingly, when a switch is operated while another switch is being operated, even if operation of one of the switches is canceled, a blanking period can be provided. Therefore, faulty detection of rush current as abnormal current is prevented.

Figure 20:
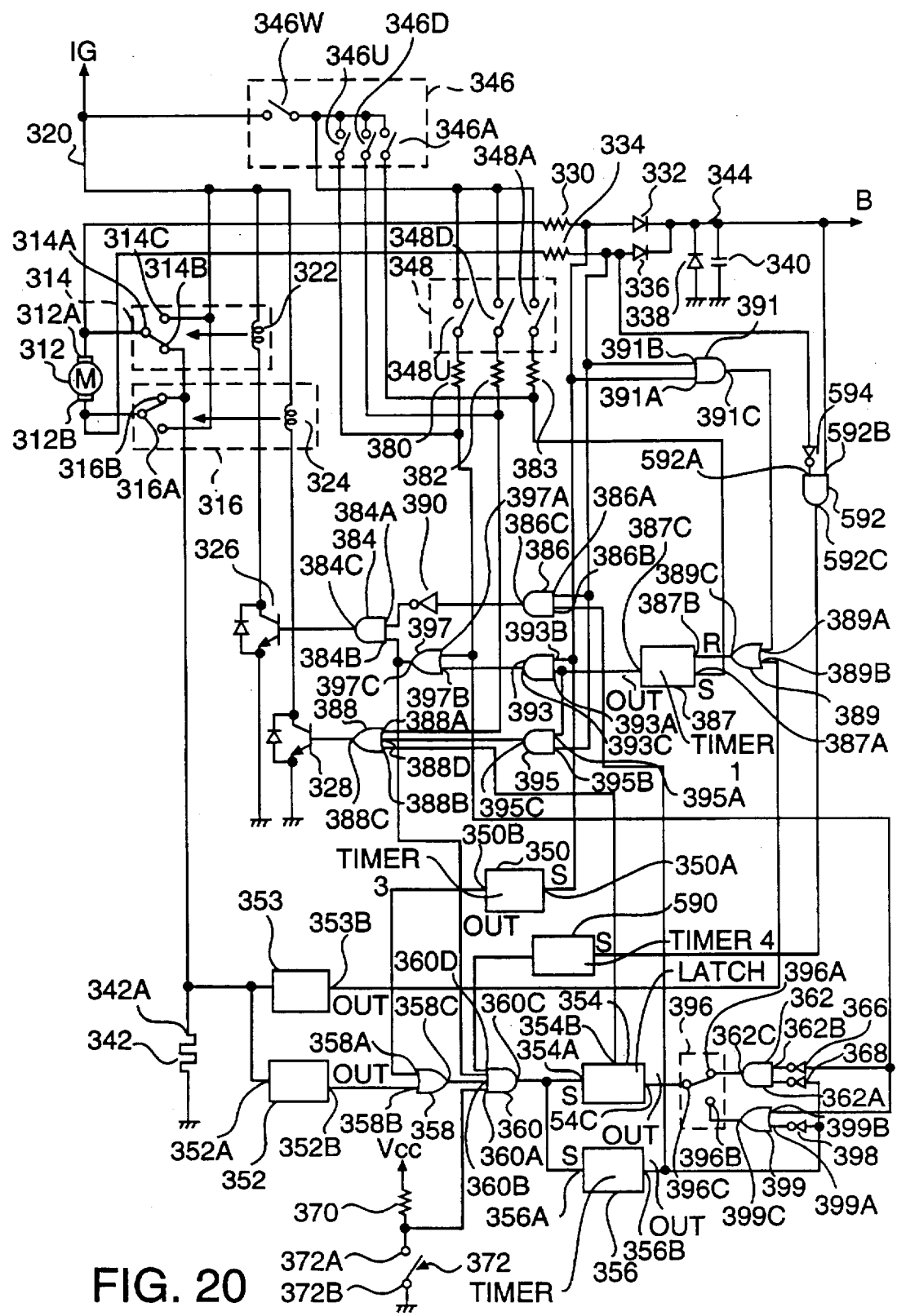
FIG. 20 is a block diagram illustrating a schematic structure of a power window driving control device (in which automatic switches are used for manual operation as well) relating to the sixth embodiment.

The present embodiment describes only an example in which manual operation is used. However, as illustrated in FIG. 20, the present embodiment is also applicable to a power window apparatus in which an automatic switch is provided. After the occupant operates a switch, the automatic switch maintains the operated state and continues the opening or closing operation of the window glass until the window is either completely open or completely closed.

The circuit diagram in FIG. 20 of a power window apparatus provided with an automatic switch will be described hereinafter. Structural parts which are the same as those in the circuit diagram (FIG. 17) of the above-described manual power window apparatus are denoted by the same reference numerals, and description thereof is omitted. Only the structures of different parts are described.

Automatic switches 346A, 348A are provided at the driver's side switch 346 and the front passenger's side switch 348, respectively. A structure in which an automatic switch is not provided at the front passenger's side switch 348 is also possible.

The terminals of the automatic switches 346A, 346B which are not at the power source wire side are connected to a start terminal 387A of a timer circuit 387 via a resistor 383. A reset terminal 387B of the timer circuit 387 is connected to the output terminal 389C of the OR circuit 389. Namely, the timer circuit 387 is reset by a high level signal from the OR circuit 389, and is started by the automatic switches 346A, 348A being turned on.

The input terminals 389A, 389B of the OR circuit 389 are connected respectively to an output terminal 391C of an AND circuit 391 and the output terminal of a current detection circuit 353.

Two input terminals 391A, 391B of the AND circuit 391 are connected to the power source wire 344 between the resistor 330 and the diode 332, and between the resistor 334 and the diode 336, respectively. Therefore, when the motor 312 is driven, the AND circuit 391 outputs a high level signal, and when the motor 312 is not driven, the AND circuit 391 outputs a low level signal. Because the current detection circuit 353 has the same operation as the previously-described current detection circuit 352, detailed description of the current detection circuit 353 is omitted.

An output terminal 387C of the timer circuit 387 is connected to the respective first input terminals 393A, 395A of AND circuits 393, 395. A second input terminal 393B of the AND circuit 393 is connected to the power source wire 344 between the resistor 330 and the diode 332. A second input terminal 395B of the AND circuit 395 is connected to the power source wire 344 between the resistor 334 and the diode 336. An output terminal 393C of the AND circuit 393 is connected to a second input terminal 397B of an OR circuit 397. The signal wires from the terminals of the raising switches 346U, 348U which are not at the power source wire side are connected to the first input terminal 397A of the OR circuit 397. The output terminal of the OR circuit 397 is connected to the second input terminal 384B of the AND circuit 384 for turning the transistor 326 on.

An output terminal 395C of the AND circuit 395 is connected to a third input terminal 388D of the OR circuit 388 for turning the transistor 328 on.

In accordance with the above-described structure, when the automatic switches 346A, 348A are turned on, the timer circuit 387 is reset/started, and the driving of the motor 312 can be continued for a predetermined time. When abnormal current is detected by the current detection circuit 353, the timer circuit 387 is reset. The output signal becomes a low level signal, and the driving of the motor 312 is stopped. Thereafter, the above described reversal operations are effected by detection of abnormal current by the current detection circuit 352.

Further, when the window glass is raised and is completely closed, the driving of the motor 312 is stopped in the same way as described above. However, because a low level signal is input to the input terminal 360A of the AND circuit 360, the reversal operations are not effected.

In a power window apparatus equipped with an automatic switch, a changeover switch 396 may be provided so that it is possible to select between detecting a foreign object being caught during automatic operation only, and detecting a foreign object being caught regardless of whether automatic or manual operation is being effected.

Namely, the output terminal 356B of the timer circuit 356 is bifurcated, and the furcations are connected to first input terminals 362A, 399A of an AND circuit 362 and an OR circuit 399 via inverters 368,398, respectively. The terminals of the raising switches 346U, 348U which are not at the power source wire side are connected to a second input terminal 362B of the AND circuit 362 via an inverter 366. The terminals of the raising switches 346U, 348U which are not at the power source wire side are directly connected to a second input terminal 399B of the OR circuit 399. Output terminals 362C, 399C of the AND circuit 362 and the OR circuit 399 are connected to a first contact 396A and a second contact 396B, respectively, of the changeover switch 396. A common contact 396C of the changeover switch 396 is connected to the reset terminal 354C of the latch circuit 354.

In accordance with the above-described structure, it is possible to select between detecting a foreign object being caught during automatic operation only, and detecting a foreign object being caught regardless of whether automatic or manual operation is being effected.

Further, the present embodiment describes an example including switches for raising and lowering the window glasses on the driver's side and the front passenger's side. However, the present invention is not limited to the same and may be applied to switches for raising and lowering a window glass disposed anywhere in a vehicle. In this case, the switch for manually raising/lowering the front passenger's side window glass, which is described in the present embodiment, may be replaced by a switch for raising/lowering a rear window glass disposed at a rear passenger's seat. By providing the same structure as that described in the present embodiment, the present invention is applicable to all of the switches for raising/lowering the window glasses of the vehicle.

Further, in the present embodiment, an example is described in which the window glass is moved vertically. However, the present invention is not limited to the same. The present invention can be easily applied to, for example, a case in which a window glass is moved horizontally, such as a sunroof disposed at the top portion of a vehicle, or the like. Moreover, the present invention is also applicable to cases in which a window glass is moved in an inclined or a transverse direction.

What is claimed is:

1. A power window driving control device which moves a window glass of a vehicle in opening and closing directions by a driving force of a motor, comprising:

a manual switch for designating closing of said window glass only during operation of said manual switch by a vehicle occupant;

an automatic switch for designating closing of said window glass by operation of said automatic switch by said vehicle occupant;

measuring means for measuring time elapsed since closing of said window glass was designated by one of said manual switch and said automatic switch;

a sensor for detecting a completely closed state of said window glass;

current detecting means for detecting that a current flowing to said motor when said window glass is being closed exceeds a predetermined value;

driving control means for at least one of stopping and reversing said motor in response to one of a first state and a second state, wherein said driving control means stops and said motor in said first state in which said current detecting means detects that said current flowing to said motor exceeds said predetermined value and said completely closed state of said window glass is not detected by said sensor, and said driving control means stop said motor in said second state in which the time elapsed since closing of said window glass was designated exceeds a predetermined time;

prohibiting means for prohibiting driving of said motor so that said window glass is not moved in said closing direction during a period in which designation for closing of said window glass by said manual switch or said automatic switch continues after said motor is stopped by said driving control means; and switching means for rendering said prohibiting means non-operative including means for enabling only operation of said manual switch to drive said motor when said prohibiting means is rendered non-operative.

2. A power window driving control device which moves a window glass of a vehicle in opening and closing directions by a motor, comprising:

a plurality of operating switches, each equipped with an opening switch for opening said window glass and a closing switch for closing said window glass, said plurality of operating switches including a first operating switch located in a vicinity of the driver's seat for closing said window glass, and a second operating switch located in a vicinity of a seat for which said window glass is provided for opening and closing said window glass;

determining means for determining whether current flowing to said motor when said window glass is being closed exceeds a predetermined value;

a sensor for detecting a completely closed state of said window glass;

signal outputting means for outputting a reversing signal for driving said motor in reverse when said determining means determines that said current flowing to said motor exceeds said predetermined value and said window glass is detected as being in an open state by said sensor; and determination prohibiting means for prohibiting said determining means from determining whether the current flowing to said motor exceeds said predetermined value for a predetermined time at one of a beginning of operation of any of said plurality of operating switches, and an operational cancellation of an opening switch or closing switch when an opening switch of said second operating switch and a closing switch of said first switch are operated simultaneously for said same window glass.

3. A power window driving control device according to claim 2, wherein said predetermined time is approximately 50 msec.

* * * * *